(12) United States Patent
Ichiki

(10) Patent No.: US 12,153,127 B2
(45) Date of Patent: Nov. 26, 2024

(54) INFORMATION PROCESSING DEVICE AND INFORMATION PROCESSING METHOD, COMPUTER PROGRAM, INFORMATION PROCESSING SYSTEM, AND MOBILE DEVICE

(71) Applicant: Sony Semiconductor Solutions Corporation, Kanagawa (JP)

(72) Inventor: Hiroshi Ichiki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 680 days.

(21) Appl. No.: 17/264,278

(22) PCT Filed: Jul. 23, 2019

(86) PCT No.: PCT/JP2019/028923
§ 371 (c)(1),
(2) Date: Jan. 28, 2021

(87) PCT Pub. No.: WO2020/031689
PCT Pub. Date: Feb. 13, 2020

(65) Prior Publication Data
US 2021/0302570 A1 Sep. 30, 2021

(30) Foreign Application Priority Data

Aug. 9, 2018 (JP) .................................. 2018-150476

(51) Int. Cl.
*G01S 13/931* (2020.01)
*G01S 7/40* (2006.01)
(Continued)

(52) U.S. Cl.
CPC .......... *G01S 13/931* (2013.01); *G01S 7/4056* (2013.01); *G01S 7/415* (2013.01); *G01S 13/86* (2013.01); *G01S 2013/9327* (2020.01)

(58) Field of Classification Search
CPC ........ G01S 13/34; G01S 13/86; G01S 13/584; G01S 13/867; G01S 13/931;
(Continued)

(56) References Cited

U.S. PATENT DOCUMENTS

2004/0246167 A1 12/2004 Kumon et al.
2010/0007476 A1* 1/2010 Klotz .................... G06V 20/58
340/425.5
(Continued)

FOREIGN PATENT DOCUMENTS

JP H04-315080 A 11/1992
JP 2004-191131 A 7/2004
(Continued)

OTHER PUBLICATIONS

International Search Report and English translation thereof mailed Oct. 21, 2019 in connection with International Application No. PCT/JP2019/028923.

(Continued)

*Primary Examiner* — Peter M Bythrow
*Assistant Examiner* — Nazra Nur Waheed
(74) *Attorney, Agent, or Firm* — Wolf, Greenfield & Sacks, P.C.

(57) ABSTRACT

Provided are an information processing device and an information processing method for processing detection information of a sensor, a computer program, an information processing system, and a mobile device.
The information processing device includes a processing unit that performs computation processing of a detection signal of a radar of FCM mode, and a control unit that controls the computation processing mode in the processing unit on the basis of the detection result of another sensor. The radar is mounted on a vehicle and used, and the another sensor is a vehicle-mounted sensor of the same vehicle. The (Continued)

control unit controls at least one of the computation area or the computation accuracy of computation processing in the processing unit on the basis of the detection result of the another sensor.

20 Claims, 12 Drawing Sheets

(51) Int. Cl.
*G01S 7/41* (2006.01)
*G01S 13/86* (2006.01)

(58) Field of Classification Search
CPC ...... G01S 17/931; G01S 13/04; G01S 13/865; G03B 7/28; G06V 20/56; G06V 20/58; B60W 60/0027; B60W 60/0015; B60W 30/00; G06T 7/11; G05D 1/0088
See application file for complete search history.

(56) References Cited

U.S. PATENT DOCUMENTS

| | | |
|---|---|---|
| 2010/0253593 A1 | 10/2010 | Seder |
| 2013/0241763 A1 | 9/2013 | Kawabe et al. |
| 2016/0003936 A1 | 1/2016 | Hibino |
| 2018/0095173 A1 | 4/2018 | Kurono |
| 2018/0203107 A1* | 7/2018 | Asanuma ............ G01S 13/343 |

FOREIGN PATENT DOCUMENTS

| | | |
|---|---|---|
| JP | 2008-509413 A | 3/2008 |
| JP | 2009-058316 A | 3/2009 |
| JP | 2009-181315 A | 8/2009 |
| JP | 2013-195245 A | 9/2013 |
| JP | 2014-169922 A | 9/2014 |
| JP | 2016114577 A | 6/2016 |
| JP | 2017024361 | 7/2017 |
| JP | 2017191066 | 9/2017 |
| JP | 2018059813 A | 4/2018 |
| JP | 2018-115936 A | 7/2018 |
| JP | 2019-66284 A | 4/2019 |
| WO | WO-2008087092 A1 * | 7/2008 ........... G01S 13/726 |
| WO | WO-2015190565 A | 12/2015 |
| WO | WO-2016003474 A1 | 1/2016 |
| WO | 2019/008640 A1 | 1/2019 |
| WO | WO-2019009356 A | 1/2019 |

OTHER PUBLICATIONS

International Written Opinion and English translation thereof mailed Oct. 21, 2019 in connection with International Application No. PCT/JP2019/028923.
International Preliminary Report on Patentability and English translation thereof mailed Feb. 18, 2021 in connection with International Application No. PCT/JP2019/028923.
Extended European Search Report issued Jul. 14, 2021 in connection with European Application No. 19847375.3.

* cited by examiner

INFORMATION PROCESSING DEVICE AND INFORMATION PROCESSING METHOD, COMPUTER PROGRAM, INFORMATION PROCESSING SYSTEM, AND MOBILE DEVICE

CROSS-REFERENCE TO RELATED APPLICATIONS

This application claims the benefit under 35 U.S.C. § 371 as a U.S. National Stage Entry of International Application No. PCT/JP2019/028923, filed in the Japanese Patent Office as a Receiving Office on Jul. 23, 2019, which claims priority to Japanese Patent Application Number JP2018-150476, filed in the Japanese Patent Office on Aug. 9, 2018, each of which is hereby incorporated by reference in its entirety.

TECHNICAL FIELD

The technology disclosed in the present specification mainly relates to an information processing device and an information processing method for processing detection information of a sensor that recognizes the external environment, a computer program, an information processing system, and a mobile device.

BACKGROUND ART

In order to implement automatic driving or an advanced driver assistance system (ADAS), it is necessary to detect various objects such as other vehicles, people, or lanes, and furthermore, to detect objects not only in the daytime in fine weather but also in various environments, for example, in rainy weather or at night. For this reason, many external environment recognition sensors of different types such as cameras, millimeter-wave radars, or laser radars are beginning to be mounted on vehicles. Among these, a millimeter-wave radar can detect obstacles that reflect radio waves, such as surrounding vehicles or bicycles, even in adverse environments for cameras that capture visible light, such as night, fog or rainfall, or backlight. That is, a millimeter-wave radar is an important technology of the ADAS that can make up for the weaknesses of a camera.

Conventionally, an FMCW mode that uses a frequency modulated-continuous wave (FM-CW), which is a frequency-modulated continuous wave, as a radar wave has been known. When an FMCW mode radar device receives a reflected wave from a target for the radar wave transmitted through the antenna as a received signal, for example, the FMCW mode radar device mixes and frequency-converts the received signal and the transmitted signal, and, when detecting a beat signal having a difference frequency between the transmitted signal and the received signal, performs analog to digital conversion (A/D conversion) and fast Fourier transform (FFT) analysis on the data string after the A/D conversion so as to measure the relative distance, the relative speed, and the like of the targets. However, the FMCW mode has a problem that, when targets having different speeds such as a pedestrian and a bicycle approach, one of them is overlooked.

Thus, in recent years, a fast chirp modulation (FCM) mode radar device (see Patent Document 1, for example) that uses a chirp signal, in which the frequency of a millimeter wave signal continuously and rapidly increases or decreases with the passage of time, as a radar wave is attracting attention. The radar processing of FCM mode has an advantage that the distance resolution or detection of the speed of the target object can be expanded by increasing the frequency modulating speed of the millimeter wave signal.

A radar device of FCM mode also mixes and frequency-converts the received signal and the transmitted signal, and, when detecting a beat signal having a difference frequency between a transmitted signal and a received signal, performs A/D conversion and FFT analysis on the data string after the A/D conversion as in the FMCW mode. However, in the FCM mode, for example, the relative distance to the target or the relative speed is measured by performing a two-dimensional FFT analysis with the distance direction as the vertical axis and the number of chirp signals transmitted as the horizontal axis.

CITATION LIST

Patent Document

Patent Document 1: Japanese Patent Application Laid-Open No. 2016-3873

SUMMARY OF THE INVENTION

Problems to be Solved by the Invention

A main object of the technology disclosed in this specification is to provide an information processing device and an information processing method for processing detection information of a sensor that recognizes the external environment, a computer program, an information processing system, and a mobile device.

Solutions to Problems

A first aspect of the technology disclosed in this specification is an information processing device including:
  a processing unit that performs computation processing of a detection signal of a radar of FCM mode; and
  a control unit that controls the computation processing mode in the processing unit on the basis of detection result of another sensor.

The radar is mounted on a vehicle and used, and the another sensor is a vehicle-mounted sensor of the same vehicle. The control unit controls at least one of the computation area or the computation accuracy of computation processing in the processing unit on the basis of the detection result of the another sensor. Furthermore, the control unit selects a target to be subjected to computation processing by the processing unit on the basis of the detection result of the another sensor.

Furthermore, a second aspect of the technology disclosed in this specification is an information processing method including:
  a process step of performing computation processing of a detection signal of a radar of FCM mode; and
  a control step of controlling the computation processing mode in the process step on the basis of the detection result of another sensor.

Furthermore, a third aspect of the technology disclosed in this specification is
  a computer program written in a computer-readable format to cause a computer to function as:
  a processing unit that performs computation processing of a detection signal of a radar of FCM mode; and
  a control unit that controls the computation processing mode in the processing unit on the basis of the detection result of another sensor.

The computer program according to the third aspect defines a computer program written in a computer-readable format so as to implement predetermined processing on a computer. In other words, by installing the computer program according to the third aspect into a computer, a collaborative action is exhibited on the computer, and an action effect similar to the information processing device according to the first aspect can be obtained.

Furthermore, a fourth aspect of the technology disclosed in this specification is an information processing system including:
- a radar and another vehicle-mounted sensor mounted on a vehicle;
- a recognition unit that performs recognition processing on the basis of a detection signal of the vehicle-mounted sensor;
- a processing unit that performs computation processing of the detection signal of the radar by the FCM mode; and
- a control unit that controls a computation processing mode in the processing unit on the basis of the result of recognition by the recognition unit.

However, the term "system" used herein refers to a logical collection of a plurality of devices (or functional modules that implement a specific function), and whether the devices or the functional modules are located in a single housing or not does not matter.

Furthermore, a fifth aspect of the technology disclosed in this specification is a mobile device including:
- a mobile body;
- a radar and another sensor mounted on the mobile body;
- a recognition unit that performs recognition processing on the basis of a detection signal of the another sensor;
- a processing unit that performs computation processing of the detection signal of the radar by the FCM mode;
- a control unit that controls the computation processing mode in the processing unit on the basis of the result of recognition by the recognition unit; and
- a mobile body control unit that controls the mobile body on the basis of the result of processing by the processing unit.

Effects of the Invention

It is possible with the technology disclosed in this specification to provide an information processing device and an information processing method for mainly processing detection information of a sensor that recognizes the external environment, a computer program, an information processing system, and a mobile device.

Note that the effects described in the present specification are merely examples, and the effects of the present invention are not limited thereto. Furthermore, the present invention may produce additional effects in addition to the effects described above.

Other objects, characteristics, and advantages of the technology disclosed in the present specification will further become apparent from the more detailed description based on the embodiments described below and the accompanying drawings.

MODE FOR CARRYING OUT THE INVENTION

The following description will explain embodiments of the technology disclosed in the present specification in detail with reference to the drawings.

Figure 1:
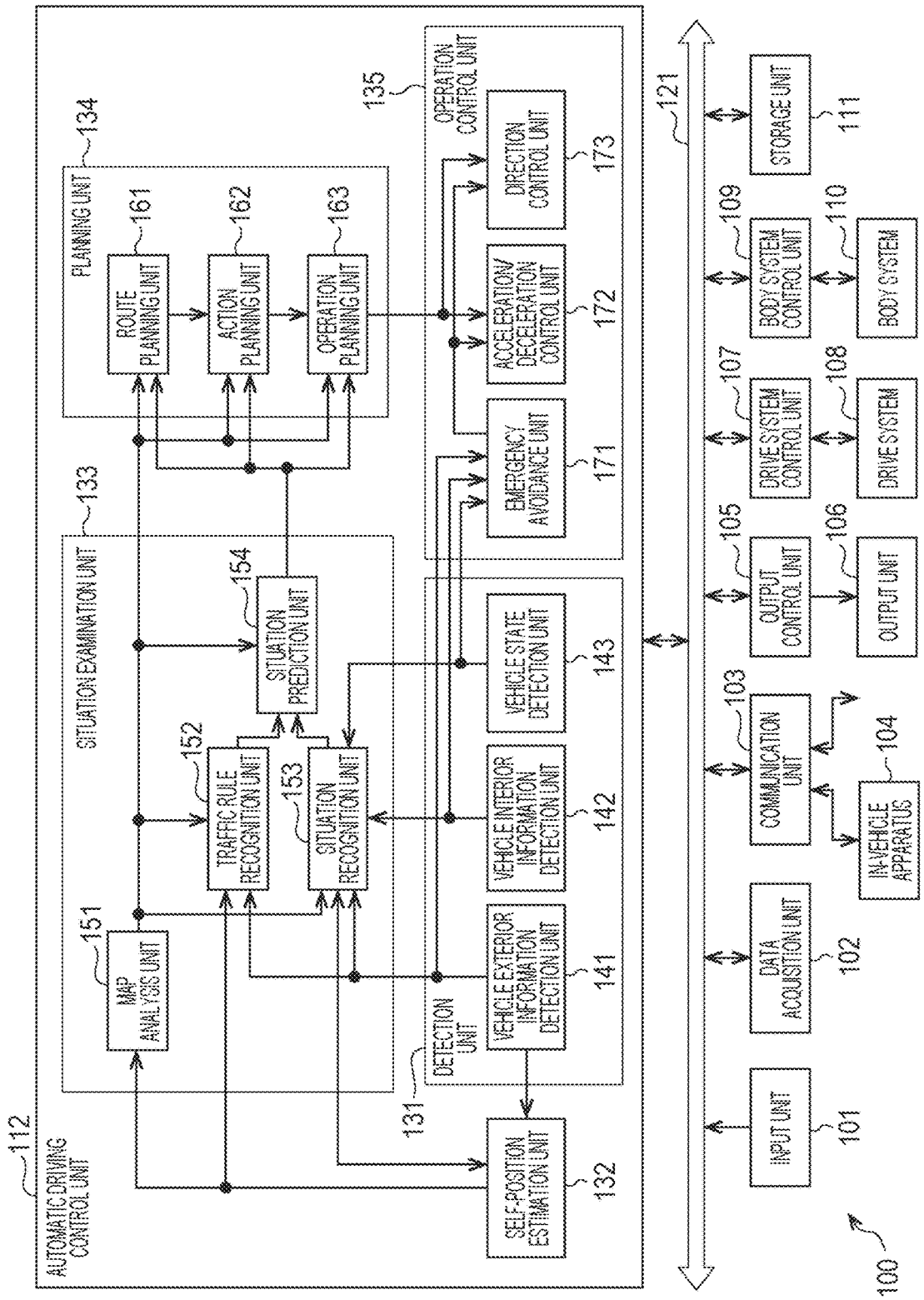
FIG. 1 is a block diagram illustrating a configuration example of a schematic function of a vehicle control system 100.

FIG. 1 is a block diagram illustrating a configuration example of a schematic function of a vehicle control system 100, which is an example of a mobile body control system to which the present technology can be applied.

In a case where a vehicle provided with the vehicle control system 100 is distinguished from other vehicles, note that the vehicle is hereinafter referred to as a subject car or a subject vehicle.

The vehicle control system 100 includes an input unit 101, a data acquisition unit 102, a communication unit 103, an in-vehicle apparatus 104, an output control unit 105, an output unit 106, a drive system control unit 107, a drive system 108, a body system control unit 109, a body system 110, a storage unit 111, and an automatic driving control unit 112. The input unit 101, the data acquisition unit 102, the communication unit 103, the output control unit 105, the drive system control unit 107, the body system control unit 109, the storage unit 111, and the automatic driving control unit 112 are connected with each other via a communication network 121. The communication network 121 is constituted of, for example, a controller area network (CAN), a local interconnect network (LIN), a local area network (LAN), or a vehicle-mounted communication network, a bus, or the like compliant with an arbitrary standard such as the FlexRay (registered trademark). Note that the units of the vehicle control system 100 may be directly connected with each other without using the communication network 121.

In a case where the units of the vehicle control system 100 communicate with each other via the communication network 121, note that the description of the communication network 121 will be omitted hereinafter. In a case where the input unit 101 and the automatic driving control unit 112 communicate with each other via the communication network 121, for example, it is simply described that the input unit 101 and the automatic driving control unit 112 communicate with each other.

The input unit 101 includes a device to be used by a passenger to input various data, instructions, or the like. For example, the input unit 101 includes an operation device such as a touch panel, a button, a microphone, a switch, and a lever, and an operation device or the like that enables input by a method other than manual operation such as voice or gesture. Furthermore, for example, the input unit 101 may be an externally connected device such as a remote control device that uses infrared light or other radio waves, or a mobile apparatus or a wearable apparatus that corresponds to the operation of the vehicle control system 100. The input unit 101 generates an input signal on the basis of data, instructions, or the like inputted by the passenger, and supplies the input signal to each unit of the vehicle control system 100.

The data acquisition unit 102 includes various sensors or the like that acquire data to be used for processing of the vehicle control system 100, and supplies the acquired data to each unit of the vehicle control system 100.

For example, the data acquisition unit 102 includes various sensors or the like for detecting the state or the like of the subject car. Specifically, for example, the data acquisition unit 102 includes a gyro sensor, an acceleration sensor, an inertial measurement unit (IMU), and a sensor or the like for detecting the accelerator pedal manipulated variable, the brake pedal manipulated variable, the steering wheel steering angle, the engine speed, the motor speed, the rotational speed of the wheels, or the like.

Furthermore, for example, the data acquisition unit 102 includes various sensors for detecting information on the outside of the subject car. Specifically, for example, the data acquisition unit 102 includes an imaging device such as a time of flight (ToF) camera, a stereo camera, a monocular camera, an infrared camera, and another camera. Furthermore, for example, the data acquisition unit 102 includes an environment sensor for detecting weather, atmospheric phenomena, or the like, and an ambient information detection sensor for detecting objects around the subject car. The environment sensor is constituted of, for example, a raindrop sensor, a fog sensor, a sunshine sensor, a snow sensor, or the like. The ambient information detection sensor is constituted of, for example, an ultrasonic sensor, a millimeter-wave radar, light detection and ranging (LiDAR, Laser Imaging Detection and Ranging), a sonar, or the like.

Moreover, for example, the data acquisition unit 102 includes various sensors for detecting the current position of the subject car. Specifically, for example, the data acquisition unit 102 includes a global navigation satellite system (GNSS) receiver or the like that receives a GNSS signal from a GNSS satellite.

Furthermore, for example, the data acquisition unit 102 includes various sensors for detecting information on the vehicle interior. Specifically, for example, the data acquisition unit 102 includes an imaging device that images a driver, a biometric sensor that detects biological information of the driver, a microphone that collects voice in the vehicle interior, and the like. The biometric sensor is provided on, for example, a seat surface, a steering wheel, or the like, and detects biological information of a passenger sitting on a seat or a driver who holds the steering wheel.

The communication unit 103 communicates with the in-vehicle apparatus 104, and various vehicle exterior apparatuses, servers, base stations, or the like to transmit data supplied from each unit of the vehicle control system 100 and supply the received data to each unit of the vehicle control system 100. Note that the communication protocol supported by the communication unit 103 is not particularly limited, and furthermore, the communication unit 103 can support a plurality of types of communication protocols.

For example, the communication unit 103 performs wireless communication with the in-vehicle apparatus 104 by wireless LAN, the Bluetooth (registered trademark), near field communication (NFC), wireless USB (WUSB), or the like. Furthermore, for example, the communication unit 103 makes wired communication with the in-vehicle apparatus 104 by a universal serial bus (USB), a high-definition multimedia interface (HDMI), mobile high-definition link (MHL), or the like via a connection terminal (and a cable if necessary) (not shown).

Moreover, for example, the communication unit 103 communicates with an apparatus (e.g., application server or control server) existing on an external network (e.g., the Internet, cloud network, or network unique to business operator) via a base station or an access point. Furthermore, for example, the communication unit 103 communicates with a terminal (e.g., terminal of pedestrian or store, or machine type communication (MTC) terminal) existing in the vicinity of the subject car by using peer to peer (P2P) technology. Moreover, for example, the communication unit 103 performs V2X communication such as vehicle to vehicle communication, vehicle to infrastructure communication, vehicle to home communication, and vehicle to pedestrian communication. Furthermore, for example, the communication unit 103 includes a beacon receiving unit, receives radio waves or electromagnetic waves transmitted from a wireless station or the like installed on the road, and obtains information such as the current position, traffic congestions, traffic regulations, or required time.

The in-vehicle apparatus 104 includes, for example, a mobile apparatus or a wearable apparatus owned by a passenger, an information apparatus that is carried in or attached to the subject car, a navigation device that searches for a route to an arbitrary destination, and the like.

The output control unit 105 controls the output of various information to a passenger of the subject car or to the vehicle exterior. For example, the output control unit 105 generates an output signal including at least one of visual information (e.g., image data) or auditory information (e.g., voice data), and supplies the output signal to the output unit 106 to control output of visual information and auditory information from the output unit 106. Specifically, for example, the output control unit 105 synthesizes image data captured by different imaging devices of the data acquisition unit 102 to generate an overhead image, a panoramic image, or the like, and supplies an output signal including the generated image to the output unit 106. Furthermore, for example, the output control unit 105 generates voice data including a warning sound, a warning message, or the like for a danger such as collision, contact, or entry into a dangerous zone, and supplies an output signal including the generated voice data to the output unit 106.

The output unit 106 includes a device capable of outputting visual information or auditory information to a passenger of the subject car or to the vehicle exterior. For example, the output unit 106 includes a display device, an instrument panel, an audio speaker, a headphone, a wearable device such as a glasses-type display to be worn by a passenger, a projector, a lamp, or the like. The display device included in the output unit 106 may be not a device having a normal display but a device that displays visual information in the field of view of the driver such as a head-up display, a transmissive display, or a device having an augmented reality (AR) display function, for example.

The drive system control unit 107 controls the drive system 108 by generating various control signals and supplying the control signals to the drive system 108. Furthermore, the drive system control unit 107 supplies a control signal to each unit other than the drive system 108 as necessary to give notification or the like of the control state of the drive system 108.

The drive system 108 includes various devices related to the drive system of the subject car. For example, the drive system 108 includes a driving force generator for generating driving force of an internal combustion engine, a drive motor, or the like, a driving force transmission mechanism for transmitting the driving force to the wheels, a steering mechanism for adjusting the steering angle, a braking device that generates braking force, an antilock brake system (ABS), an electronic stability control (ESC), an electric power steering device, and the like.

The body system control unit 109 controls the body system 110 by generating various control signals and supplying the control signals to the body system 110. Furthermore, the body system control unit 109 supplies a control signal to each unit other than the body system 110 as necessary to give notification or the like of the control state of the body system 110.

The body system 110 includes various devices of the body system mounted on the vehicle body. For example, the body system 110 includes a keyless entry system, a smart key system, a power window device, a power seat, a steering wheel, an air conditioner, various lamps (e.g., head lamps, back lamps, brake lamps, blinkers, fog lamps, etc.), and the like.

The storage unit 111 includes, for example, a magnetic storage device such as a read only memory (ROM), a random access memory (RAM), or a hard disc drive (HDD), a semiconductor storage device, an optical storage device, a magneto-optical storage device, and the like. The storage unit 111 stores various programs or data to be used by each unit of the vehicle control system 100. For example, the storage unit 111 stores map data such as a three-dimensional high-accuracy map such as a dynamic map, a global map which is less accurate than the high-accuracy map and covers a wide area, and a local map including information around the subject car.

The automatic driving control unit 112 performs control of automatic driving such as autonomous traveling or driving assistance. Specifically, for example, the automatic driving control unit 112 performs cooperative control aimed at implementation of the function of an advanced driver assistance system (ADAS) including collision avoidance or shock mitigation of the subject car, follow-up traveling based on an inter-vehicle distance, vehicle speed maintenance traveling, collision warning of the subject car, or lane departure warning of the subject car. Furthermore, for example, the automatic driving control unit 112 performs cooperative control aimed at automatic driving or the like of autonomous traveling without depending on the operation of the driver. The automatic driving control unit 112 includes a detection unit 131, a self-position estimation unit 132, a situation examination unit 133, a planning unit 134, and an operation control unit 135.

The detection unit 131 detects various information necessary for control of automatic driving. The detection unit 131 includes a vehicle exterior information detection unit 141, a vehicle interior information detection unit 142, and a vehicle state detection unit 143.

The vehicle exterior information detection unit 141 performs processing of detecting information on the outside of the subject car on the basis of data or signals from each unit of the vehicle control system 100. For example, the vehicle exterior information detection unit 141 performs detection processing, recognition processing, and tracking processing of objects around the subject car, and detection processing of the distance to the objects. Objects to be detected include, for example, vehicles, people, obstacles, structures, roads, traffic lights, traffic signs, road markings, and the like. Furthermore, for example, the vehicle exterior information detection unit 141 performs processing of detecting the environment around the subject car. The surrounding environment to be detected includes, for example, weather, temperature, humidity, brightness, road surface condition, and the like. The vehicle exterior information detection unit 141 supplies data indicating the result of the detection processing to the self-position estimation unit 132, a map analysis unit 151, a traffic rule recognition unit 152, and a situation recognition unit 153 of the situation examination unit 133, and an emergency avoidance unit 171 of the operation control unit 135, and the like.

The vehicle interior information detection unit 142 performs processing of detecting information on the vehicle interior on the basis of data or signals from each unit of the vehicle control system 100. For example, the vehicle interior information detection unit 142 performs authentication processing and recognition processing of the driver, processing of detecting the state of the driver, detection processing of a passenger, processing of detecting the vehicle interior environment, and the like. The state of the driver to be detected includes, for example, the physical condition, the arousal level, the concentration level, the fatigue level, the line-of-sight direction, and the like. The vehicle interior environment to be detected includes, for example, the temperature, the humidity, the brightness, odor, and the like. The vehicle interior information detection unit 142 supplies the data indicating the result of the detection processing to the situation recognition unit 153 of the situation examination unit 133, the emergency avoidance unit 171 of the operation control unit 135, and the like.

The vehicle state detection unit 143 performs processing of detecting the state of the subject car on the basis of data or signals from each unit of the vehicle control system 100. The state of the subject car to be detected includes, for example, the speed, the acceleration, the steering angle, presence/absence and the content of abnormality, the state of driving operation, the position and the inclination of a power seat, the state of a door lock, the state of other vehicle-mounted apparatuses, and the like. The vehicle state detection unit 143 supplies data indicating the result of the detection processing to the situation recognition unit 153 of the situation examination unit 133, the emergency avoidance unit 171 of the operation control unit 135, and the like.

The self-position estimation unit 132 performs estimation processing of the position, the orientation, and the like of the subject car on the basis of data or signals from each unit of the vehicle control system 100, such as the vehicle exterior information detection unit 141, and the situation recognition unit 153 of the situation examination unit 133. Furthermore, the self-position estimation unit 132 generates a local map (hereinafter referred to as a self-position estimation map) to be used for estimating the self-position as necessary. The self-position estimation map is, for example, a high-accuracy map obtained using a technology such as simultaneous localization and mapping (SLAM). The self-position estimation unit 132 supplies data indicating the result of the estimation processing to the map analysis unit 151, the traffic rule recognition unit 152, the situation recognition unit 153, and the like of the situation examination unit 133. Furthermore, the self-position estimation unit 132 causes the storage unit 111 to store the self-position estimation map.

The situation examination unit 133 performs analysis processing of the situation of the subject car and the surroundings. The situation examination unit 133 includes the map analysis unit 151, the traffic rule recognition unit 152, the situation recognition unit 153, and a situation prediction unit 154.

The map analysis unit 151 performs analysis processing of various maps stored in the storage unit 111 as necessary while using various data or signals from each unit of the vehicle control system 100 such as the self-position estimation unit 132 and the vehicle exterior information detection unit 141, and constructs a map containing information necessary for automatic driving processing. The map analysis unit 151 supplies the constructed map to the traffic rule recognition unit 152, the situation recognition unit 153, the situation prediction unit 154, and a route planning unit 161, an action planning unit 162, an operation planning unit 163, and the like of the planning unit 134.

The traffic rule recognition unit 152 performs recognition processing of traffic rules around the subject car on the basis of data or signals from each unit of the vehicle control system 100, such as the self-position estimation unit 132, the vehicle exterior information detection unit 141, and the map analysis unit 151. By this recognition processing, for example, the position and the state of signals around the subject car, the content of traffic regulation around the subject car, lanes in which the vehicle can travel, and the like are recognized. The traffic rule recognition unit 152 supplies data indicating the result of the recognition processing to the situation prediction unit 154 and the like.

The situation recognition unit 153 performs recognition processing of the situation regarding the subject car on the basis of data or signals from each unit of the vehicle control system 100, such as the self-position estimation unit 132, the vehicle exterior information detection unit 141, the vehicle interior information detection unit 142, the vehicle state detection unit 143, and the map analysis unit 151. For example, the situation recognition unit 153 performs recognition processing of the situation of the subject car, the situation around the subject car, the situation of the driver of the subject car, and the like. Furthermore, the situation recognition unit 153 generates a local map (hereinafter referred to as a situation recognition map) to be used for recognizing the situation around the subject car as necessary. The situation recognition map is, for example, an occupancy grid map.

The situation of the subject car to be recognized includes, for example, the position, the orientation, the movement (e.g., speed, acceleration, moving direction, etc.), and presence/absence, the content, and the like of abnormality of the subject car. The situation around the subject car to be recognized includes, for example, the type and the position of surrounding stationary objects, the type, the position, and the movement (e.g., speed, acceleration, moving direction, etc.) of surrounding moving objects, the configuration and the road surface condition of surrounding roads, and the ambient weather, temperature, humidity, brightness, or the like. The state of the driver to be recognized includes, for example, the physical condition, the arousal level, the concentration level, the fatigue level, line-of-sight movement, driving operation, and the like.

The situation recognition unit 153 supplies data indicating the result of the recognition processing (including situation recognition map as necessary) to the self-position estimation unit 132, the situation prediction unit 154, and the like. Furthermore, the situation recognition unit 153 stores the situation recognition map in the storage unit 111.

The situation prediction unit 154 performs prediction processing of the situation regarding the subject car on the basis of data or signals from each unit of the vehicle control system 100, such as the map analysis unit 151, the traffic rule recognition unit 152, and the situation recognition unit 153. For example, the situation prediction unit 154 performs prediction processing of the situation of the subject car, the situation around the subject car, the situation of the driver, and the like.

The situation of the subject car to be predicted includes, for example, the behavior of the subject car, occurrence of abnormality, the travelable distance, and the like. The situation around the subject car to be predicted includes, for example, the behavior of a moving object around the subject car, change in the state of a signal, change in the environment such as weather, and the like. The situation of the driver to be predicted includes, for example, the behavior, the physical condition, and the like of the driver.

The situation prediction unit 154 supplies data indicating the result of the prediction processing to the route planning unit 161, the action planning unit 162, the operation planning unit 163, and the like of the planning unit 134 together with the data from the traffic rule recognition unit 152 and the situation recognition unit 153.

The route planning unit 161 plans a route to the destination on the basis of data or signals from each unit of the vehicle control system 100, such as the map analysis unit 151 and the situation prediction unit 154. For example, the route planning unit 161 sets a route from the current position to the designated destination on the basis of the global map. Furthermore, for example, the route planning unit 161 appropriately changes the route on the basis of traffic congestions, accidents, traffic regulations, the condition of construction or the like, the physical condition of the driver, and the like. The route planning unit 161 supplies data indicating the planned route to the action planning unit 162 or the like.

The action planning unit 162 plans behavior of the subject car for traveling safely the route planned by the route planning unit 161 within the planned time on the basis of data or signals from each unit of the vehicle control system 100, such as the map analysis unit 151 and the situation prediction unit 154. For example, the action planning unit 162 plans start, stop, traveling direction (e.g., forward, backward, left turn, right turn, direction change, etc.), a driving lane, the traveling speed, overtaking, and the like. The action planning unit 162 supplies data indicating the planned action of the subject car to the operation planning unit 163 and the like.

The operation planning unit 163 plans the operation of the subject car for implementing the action planned by the action planning unit 162 on the basis of data or signals from each unit of the vehicle control system 100, such as the map analysis unit 151 and the situation prediction unit 154. For example, the operation planning unit 163 makes a plan such as acceleration, deceleration, and a traveling trajectory. The operation planning unit 163 supplies the data indicating the planned operation of the subject car to an acceleration/deceleration control unit 172, a direction control unit 173, and the like of the operation control unit 135.

The operation control unit 135 controls the operation of the subject car. The operation control unit 135 includes the emergency avoidance unit 171, the acceleration/deceleration control unit 172, and the direction control unit 173.

The emergency avoidance unit 171 performs detection processing of an emergency such as collision, contact, entry into a dangerous zone, abnormality of the driver, or abnormality of the vehicle on the basis of the detection result of the vehicle exterior information detection unit 141, the vehicle interior information detection unit 142, and the vehicle state detection unit 143. When detecting occurrence of an emergency, the emergency avoidance unit 171 plans the operation of the subject car to avoid an emergency such as a sudden stop or a sharp turn. The emergency avoidance unit 171 supplies data indicating the planned operation of the subject car to the acceleration/deceleration control unit 172, the direction control unit 173, and the like.

The acceleration/deceleration control unit 172 performs acceleration/deceleration control for implementing the operation of the subject car planned by the operation planning unit 163 or the emergency avoidance unit 171. For example, the acceleration/deceleration control unit 172 computes the control target value of the driving force generator or the braking device for implementing the planned acceleration, deceleration, or sudden stop, and supplies a control command indicating the computed control target value to the drive system control unit 107.

The direction control unit 173 performs direction control for implementing the operation of the subject car planned by the operation planning unit 163 or the emergency avoidance unit 171. For example, the direction control unit 173 computes the control target value of the steering mechanism for implementing the traveling trajectory or a sharp turn planned by the operation planning unit 163 or the emergency avoidance unit 171, and supplies a control command indicating the computed control target value to the drive system control unit 107.

Many different types of external environment recognition sensors such as a camera, a millimeter-wave radar, and a laser radar are beginning to be mounted on vehicles in order to perform more accurate external environment recognition with the aim of implementation of automatic driving or the ADAS. Each sensor has its strong and weak points, depending on the detection principle. For example, a camera that captures visible light is not good at dark places, and a radar that detects the reflection of radio waves is not good at objects that do not easily reflect radio waves, such as people or animals. Table 1 below summarizes the strong and weak points of a radar (millimeter-wave radar), a camera, and a laser radar (LiDAR). In the table, the double circle means very good (has high recognition accuracy), the circle means good (has satisfactory recognition accuracy), and the triangle means not good (unsatisfactory recognition accuracy). By using fusion technology that combines two or more sensors, it is possible to implement more accurate external environment recognition by taking advantage of the characteristics of each sensor.

TABLE 1

| Sensor Type | Radar | Camera | LiDAR |
|---|---|---|---|
| Measured Distance | ○ | △ | ⊙ |
| Angle/Resolution | △ | ⊙ | ○ |
| Performance in Bad Weather | ⊙ | △ | ○ |
| Performance at Night | ⊙ | ○ | ⊙ |
| Target Object Classification | △ | ⊙ | ○ |

Figure 13:
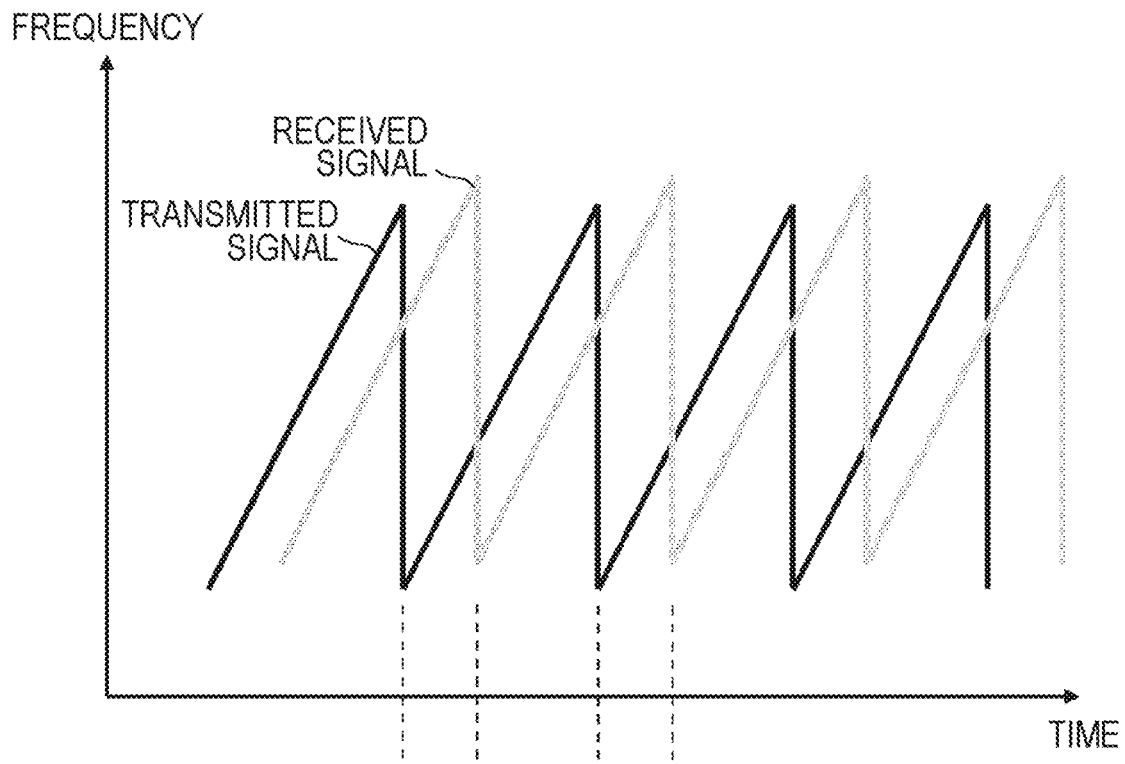
FIG. 13 is a diagram illustrating a transmitted signal and a received signal in an FCM mode, and a beat signal.
Figure 13:
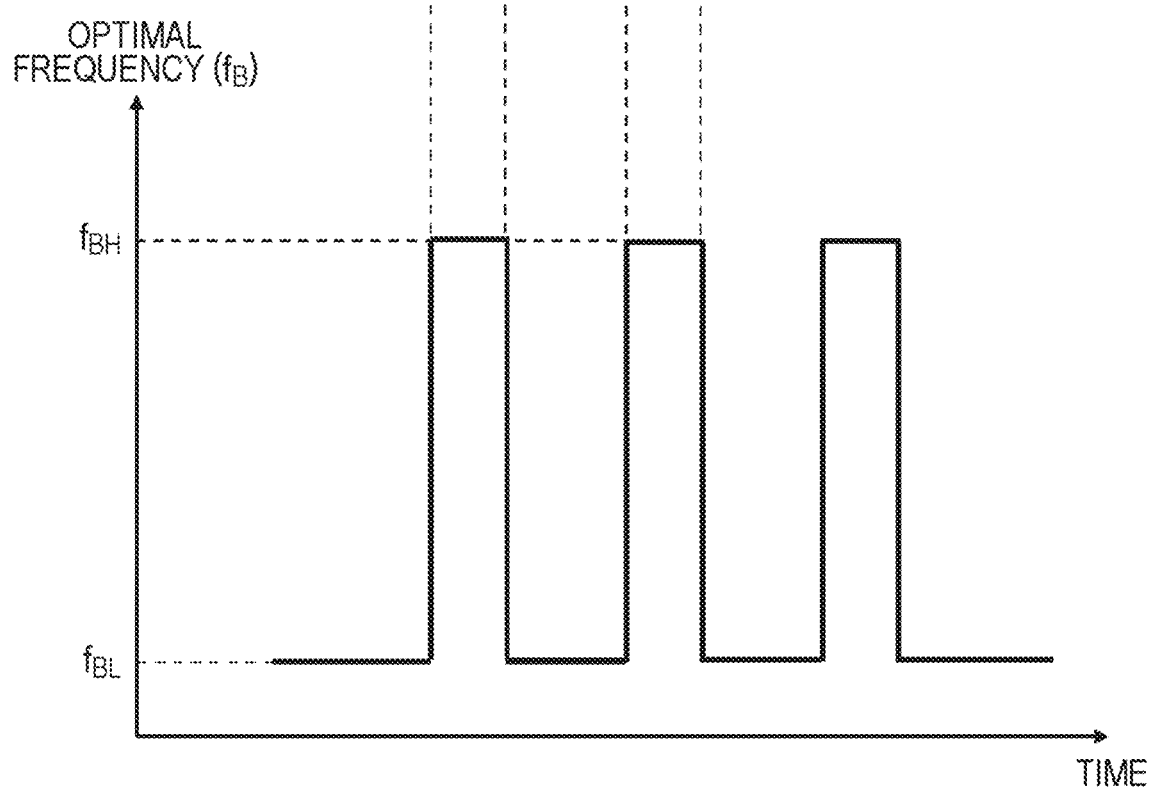

Regarding the millimeter-wave radar, although the FMCW mode that periodically modulates the frequency speed of a millimeter wave signal is the mainstream, the FCM mode that increases the frequency modulating speed has been attracting attention. In the FCM mode, the received signal and the transmitted signal are mixed and frequency-converted as in the FMCW mode, A/D conversion is performed when a beat signal having a difference frequency between the transmitted signal and the received signal is detected, and FFT solution is performed for data string after A/D conversion. Accordingly, any mode employs a similar configuration of the radar device. In the FCM mode, the distance to the measurement target and the relative speed are detected on the basis of the frequency and the phase change of a beat signal generated from the transmitted signal that generates a chirp wave whose frequency increases or decreases continuously and rapidly and the received signal obtained by receiving the reflected wave of the chirp wave from the measurement target. FIG. 13 illustrates a transmitted signal, a received signal, and a beat signal in the FCM mode. Compared to the FMCW mode in which the center frequency transits relatively slowly, the FCM mode is characterized to have excellent speed resolution because the difference between $f_{BH}$ and $f_{BL}$ at the beat frequency can be made larger by taking a more rapid frequency transition. The chirp time is approximately milliseconds for the FMCW mode, and microseconds for the FCW mode. Furthermore, since the FCM mode has a high chirp speed, the Doppler frequency can be ignored, and therefore the algorithm for calculating the detection distance is simple, and the multi-target recognition ability is also improved.

According to the FCM mode, the distance or speed detection of a target object can be expanded (that is, object detection performance is improved), while three-dimensional FFT analysis (or three-dimensional processing that repeats one-dimensional FFT, or processing of estimating the azimuth instead of the third FFT after two-dimensional FFT) is required, and the required memory and the amount of computation increase, and therefore there is a concern that cost or power consumption of the arithmetic circuit will increase. For example, in the case of an electric vehicle (EV), power consumption by the arithmetic circuit should be suppressed when the air conditioner is used or when the charge amount of the EV battery is reduced to a predetermined amount or less, since electric power is consumed.

Furthermore, in a vehicle-mounted control system that employs fusion technology that fuses a plurality of object detection sensors, sufficient measurement accuracy may not be obtained for all sensors when trying to measure all subjects, or all the required subjects may not be measured (measurement may not be in time) when trying to maintain the measurement accuracy. For example, in a case where the radar is fused with the camera, the resolution of the radar required to match the image of the camera is required. However, since the field of view (FOV) of the camera is wide, the computation load of the radar becomes enormous. Although the purpose of the vehicle-mounted radar is to measure the distance or the relative speed of the subject, it is not necessary to measure with high accuracy in all directions at all. Furthermore, in a case where a plurality of subjects exists around the subject vehicle, the priority of each subject changes from moment to moment during traveling.

Thus, in the present specification, a technology of adaptively controlling switching of the processing mode of the radar device according to the situation will be proposed below.

Switching of the processing mode of the radar device herein basically includes selecting a computation area or computation accuracy in a specific computation mode such as the FCM mode. It is possible to suppress increase in cost or power consumption by limiting the computation area and applying the FCM mode compared to a case where the FCM mode is carried out in all areas, and it is possible to measure with high resolution in the selected computation area by utilizing the surplus computation amount generated by limiting the computation area. Furthermore, in a case where the FCM mode is carried out, by suppressing the speed, the distance, or the resolution of the antenna in the computation area where the FFT analysis is carried out, the computation accuracy lowers, while the computation amount is reduced, and increase in cost or power consumption can be suppressed.

Specifically, switching of the processing mode of the radar device includes limiting the measurement target in a specific computation mode such as the FCM mode. That is, in a case where a plurality of measurement targets can exist, the distance computation using the radar device is carried out only on some specific measurement targets, and the other measurement targets are excluded from the distance computation targets, so that it is possible to obtain sufficient computation accuracy for the specific measurement target and to suppress increase in cost or power consumption while securing the required performance for the other measurement targets. For example, it is possible to limit the measurement by the radar device to a specific target object on the basis of the recognition result of another sensor such as the image recognition result of the camera or the object recognition result of the LiDAR. Furthermore, since important target objects fluctuate for each scene encountered by a traveling vehicle, the measurement target of the radar device is switched on the basis of the result of scene recognition by another sensor such as an image of the camera or object detection of the LiDAR.

Furthermore, switching of the processing mode of the radar device includes switching of the computation order for performing the recognition processing for each measurement target in a specific computation mode such as the FCM mode, that is, computation order planning. For example, in a case where there is a plurality of measurement targets around the subject vehicle, the priority of each measurement target changes from moment to moment during traveling. Thus, the priority is determined for each measurement target on the basis of the possibility of collision with the subject vehicle (e.g., expected collision time). Then, by carrying out the distance computation in the order according to the priority, it is possible to avoid collision between the subject vehicle and the measurement target and enhance the safety of the ADAS or automatic driving.

Furthermore, switching of the processing mode of the radar device may further include switching of the computation mode such as the FMCW mode or the FCM mode. According to the FCM mode, the performance of object detection is improved, while cost or power consumption is increased. On the other hand, by switching to the FMCW mode, it is possible to suppress cost or power consumption while allowing decrease in performance. Thus, the processing mode of the radar device may be switched according to the required computation accuracy, a surplus of the computation capacity, or the like. For example, the FCM mode is applied in a case where it is determined that high computation accuracy is required according to the result of object recognition or scene recognition by another sensor such as a camera, or the traveling situation of the vehicle, while switching to FMCW mode may be performed in a case where it is determined that high computation accuracy is not required. Furthermore, in a case where the vehicle is an electric vehicle, the FCM mode may be switched to the FMCW mode when the charge amount of the battery is reduced to a predetermined value or less. In order to switch the computation mode, a large scale integration (LSI) chip that carries out each computation processing of the FMCW mode and the FCM mode is mounted on the vehicle. However, the circuit modules common to the FMCW mode and the FCM mode may be shared to configure each LSI. Although the radar is mounted on a fragile part such as a bumper, even if one is destroyed, note that the other will be a backup by equipping each mode with an LSI individually.

Furthermore, in the case of a vehicle control system incorporating a fusion technology that fuses a millimeter-wave radar with another sensor such as a camera or a LiDAR, switching of the processing mode of the radar device includes switching of the fusion processing mode. That is, the processing accuracy or the computation speed of each sensor, or the computation order between sensors is switched. Furthermore, the measurement target may be limited for each sensor. For example, in bad weather when millimeter-wave radar is superior to a camera or a LiDAR, the FCM mode is adaptively carried out to secure sufficient computation accuracy by radar. On the other hand, when the required performance can be obtained even from image recognition of a camera, switching to the FMCW mode is performed to suppress increase in cost or power consumption while sacrificing the computation accuracy by the radar to some extent.

Furthermore, the "situation" for switching the processing mode of the radar device herein includes the situation around the vehicle such as the traveling situation of the target vehicle such as the ADAS or automatic driving, or the situation of the vehicle itself such as the computation capacity in the vehicle control system 100, or the power consumption amount or the surplus electric power amount. Furthermore, an instruction inputted from the driver or the like via an input device in the vehicle interior is also included in the "situation". Furthermore, in a vehicle control system connected to an external network such as the Internet, an instruction received from the outside such as the cloud is also included in the "situation".

Here, supplementary explanation will be given to the computation processing in a radar device of FCM mode. The FCM mode is a mode of detecting the distance to the target and the relative speed by performing two times of FFT processing (two-dimensional FFT processing) on a beat signal for each chirp wave generated from the transmitted signal that generates a chirp wave whose frequency continuously increases or decreases, and the received signal of the reflected wave of the chirp wave from the target. Furthermore, it is possible to carry out two-dimensional FFT processing for each antenna (or steering direction) of a plurality of receiving antennas forming an array antenna to three-dimensionally capture the distance to the target and the relative speed. The FCM mode is superior to the FMCW mode, for example, in speed resolution, and the speed resolution can be increased by increasing the number of chirp waves (number of chirps).

As described above, the FCM mode requires a larger amount of calculation than the FMCW mode. In the radar device of FCM mode, the amount of computation can be reduced by limiting the computation area or suppressing the computation accuracy. For example, the amount of computation can be reduced by limiting the speed area, the distance area, or the antenna area in which the FFT analysis processing of the FCM mode is carried out so as to limit the computation area. Furthermore, in the computation area where FFT analysis of the FCM mode is carried out, the calculation amount can be reduced by suppressing the speed, the distance, or the resolution of the antenna to lower the computation accuracy. Alternatively, in a case where the beamforming method or the Capon method is used instead of the third FFT, the amount of computation can be reduced by limiting the distance and the azimuth of the measurement target.

Figure 2:
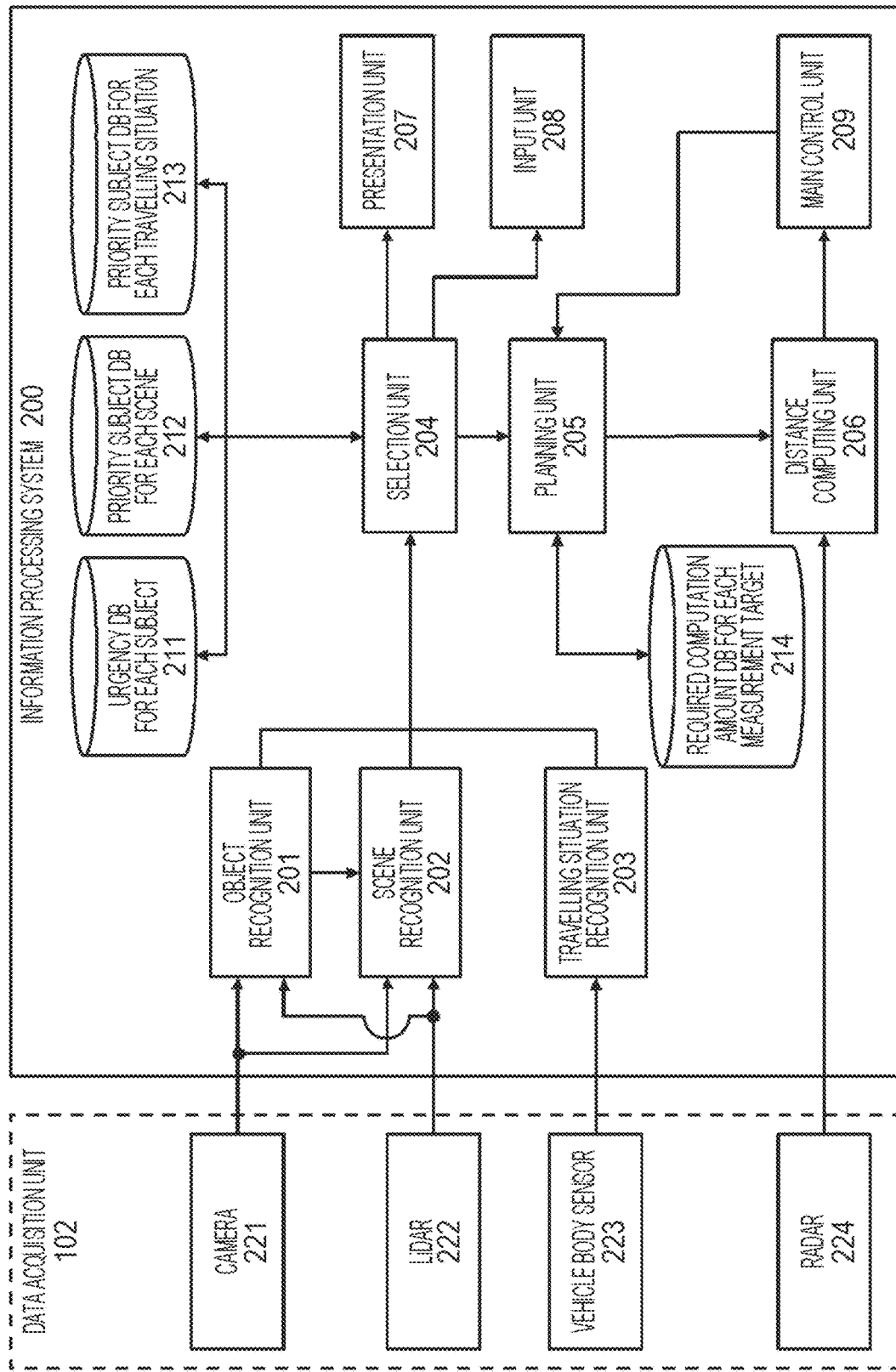
FIG. 2 is a diagram illustrating a functional configuration example of an information processing system for controlling switching of the processing mode of a vehicle-mounted radar device.

FIG. 2 illustrates a functional configuration example of an information processing system for controlling switching of the processing mode of a vehicle-mounted radar device.

An information processing system 200 in the figure includes an object recognition unit 201, a scene recognition unit 202, a traveling situation recognition unit 203, a selection unit 204, a planning unit 205, a distance computing unit 206, a presentation unit 207, an input unit 208, a main control unit 209, and various databases (DBs) 211 to 214. Furthermore, sensor signals are inputted into the information processing system 200 from various sensors such as a camera 221, a LiDAR 222, a vehicle body sensor 223, and a radar (millimeter-wave radar) 224.

The information processing system 200 is basically mounted on a vehicle and used, and more preferably, is incorporated in the vehicle control system 100 illustrated in FIG. 1. For example, some or all of the functional modules 201 to 206 are mounted in the automatic driving control unit 112, or mounted in any of the functional modules in the automatic driving control unit 112 illustrated in FIG. 1. Furthermore, the main control unit 109 corresponds to, for example, an electronic control unit (ECU) mounted on a vehicle. Furthermore, the presentation unit 209 can also be used by the output unit 106 in FIG. 1, and the input unit 208 can also be used by the input unit 101 in FIG. 1. Furthermore, the camera 221, the LiDAR 222, the vehicle body sensor 223, and the radar 224 can use the sensor included in the data acquisition unit 102 in FIG. 1. Furthermore, the various databases (DBs) 211 to 214 may be constructed in the information processing system 200 (that is, may be mounted on the vehicle), or may be external databases connected via the communication unit 103 in FIG. 1.

The object recognition unit 201 performs image recognition of an image captured by the camera 221 or performs object recognition on the basis of a detection signal of the LiDAR 222, and estimates the type of the object existing around the subject vehicle, the direction in which the object exists, or the approximate distance from the subject vehicle to the object. The object recognition unit 201 may carry out sensor fusion processing as necessary.

The scene recognition unit 202 recognizes the scene encountered by the subject vehicle on the basis of the image captured by the camera 221, the detection signal of the LiDAR 222, or the result of object recognition by the object recognition unit 201. Examples of the scene recognized here include the shape of the road being travelled, the degree of congestion, road conditions such as pedestrians, and the traveling environment such as weather or lighting. The scene recognition unit 202 may carry out sensor fusion processing as necessary.

The traveling situation recognition unit 203 inputs a sensor signal from the vehicle body sensor 223 to recognize the traveling situation of the subject vehicle. The vehicle body sensor 223 includes a gyro sensor, an acceleration sensor, an inertial measurement unit (IMU), various sensors that detect the state of the subject vehicle such as an accelerator pedal manipulated variable, a brake pedal manipulated variable, the steering angle of the steering wheel, the engine speed, the motor speed, or the rotational speed of the wheels, a battery sensor that detects the residual quantity of the vehicle-mounted battery, or an environment sensor for detecting weather, atmospheric phenomena, or the like (raindrop sensor, fog sensor, sunshine sensor, snow sensor, temperature sensor, humidity sensor, etc.). On the basis of sensor signals of these vehicle body sensors 223, the traveling situation recognition unit 203 recognizes the traveling situation such as the vehicle speed, the vehicle traveling direction, the acceleration, the acceleration direction, the absolute position of the vehicle, the ambient temperature, vibration, or raindrops.

The selection unit 204 selects a computation area or computation accuracy in a specific computation mode such as the FCM mode. The selection of the computation area to be performed by the selection unit 204 includes limiting the measurement target. In a case where there can be a plurality of measurement targets, distance computation using the radar 224 is carried out only for some specific measurement targets and the other measurement targets are excluded from the distance computation targets, so that sufficient computation accuracy can be obtained for a specific measurement target while suppressing the computation load. Furthermore, selection of the computation accuracy to be performed by the selection unit 204 includes, in the FCM mode, suppressing the speed, the distance, or the resolution of the antenna in the computation area where FFT analysis is carried out so as to lower the computation accuracy. The computation amount can be reduced by suppressing the computation accuracy. Specifically, the selection unit 204 selects a computation area (or measurement target) for which the distance computing unit 206 should carry out distance computation from a sensor signal of the radar 224, or selects computation accuracy in a specific computation area on the basis of the result of object recognition by the object recognition unit 201, the result of scene recognition by the scene recognition unit 202, and the result of traveling situation recognition by the traveling situation recognition unit 203. Furthermore, selection of the computation accuracy to be performed by the selection unit 204 may include selection of either the FCM mode or the FMCW mode (selection from a plurality of computation modes having different computation accuracies).

The selection unit 204 basically selects an object recognized by the object recognition unit 201 as an area to be subjected to distance computation, and excludes the other areas from the distance computation target. This is because it is useless to perform distance computation in a region where no object exists, which only increases the computation load unnecessarily.

Furthermore, the selection unit 204 further determines an object that is likely to collide with the subject vehicle (such as surrounding vehicles, bicycles, pedestrians, or obstacles) among objects recognized by the object recognition unit 201 on the basis of the scene recognized by the scene recognition unit 202 and selects the measurement target. For example, although an object that is close to the subject vehicle may collide, it is unlikely to collide with an oncoming vehicle or a pedestrian walking on the sidewalk, and an oncoming vehicle or a pedestrian should not be selected as a measurement target. Furthermore, pedestrians trying to go through the pedestrian crossing in front of the subject vehicle are more likely to collide, and young children being taken by their parents or elderly people walking alone are more likely to collide and should be selected as the measurement target. The selection unit 204 may select the computation accuracy to be applied to the measurement target on the basis of the scene recognized by the scene recognition unit 202. For example, high computation accuracy (or FCM mode having high computation accuracy) may be selected for general roads where there is a high possibility of collision with pedestrians, and low computation accuracy (or FMCW mode not having high computation accuracy) may be selected for a highway.

Furthermore, the selection unit 204 selects the measurement target on the basis of the traveling situation of the subject vehicle recognized by the traveling situation recognition unit 203 from the detection result of the vehicle body sensor 223. For example, in bad weather in which a millimeter-wave radar is superior to a camera or a LiDAR, the selection unit 204 increases the number of measurement targets of the radar 224 to secure the traveling safety of the subject vehicle. On the contrary, in a case where sufficient object recognition performance can be obtained even with a camera or a LiDAR, increase in cost or power consumption due to FCM mode distance computation is suppressed by limiting the measurement target. Furthermore, the selection unit 204 may select the measurement target on the basis of the condition of the driver monitored by the vehicle body sensor 223, such as acceleration/deceleration, turning the steering wheel, or lowering of the attention of the driver. Furthermore, the selection unit 204 selects the measurement target on the basis of the computation capacity of the distance computing unit 206 (or information processing system 200), the power consumption amount, the surplus electric power amount, or the like. If there is no margin in the computation capacity or the electric power amount, the selection unit 204 limits the measurement target to ensure that the distance computation is performed for an urgent measurement target. On the contrary, if there is a margin in the computation capacity or the electric power amount, the selection unit 204 may increase the number of measurement targets to further secure the safety. The selection unit 204 may select the computation accuracy to be applied to the measurement target on the basis of the scene recognized by the traveling situation recognition unit 203. For example, high computation accuracy (or FCM mode having high computation accuracy) may be selected when the vehicle is an electric vehicle and the battery charge amount is sufficient, while low computation accuracy (or FMCW mode not having high computation accuracy) may be selected when the charge amount is reduced to a predetermined value or less. Furthermore, the FCM mode may be selected in order to expand the detection of the speed of the measurement target when the vehicle speed is high, while the FMCW mode may be selected when the vehicle speed is low. Furthermore, high computation accuracy (or FCM mode having high computation accuracy) may be selected when the steering angle of the steering wheel changes (that is, when the steering wheel is operated) and the risk of collision increases, while low computation accuracy (or FMCW mode not having high computation accuracy) may be selected when the vehicle is going straight.

There are various factors for the selection unit 204 to select the computation area and the computation accuracy. Thus, the selection unit 204 refers to at least one database of the urgency database for each subject 211, the priority subject database for each scene 212, and the priority subject database for each traveling situation 213 to select computation accuracy or a measurement target to be subjected to the distance computation.

The urgency database for each subject 211 stores information regarding the required resolution or the urgency to be subjected to distance computation for each subject that can be recognized by the object recognition unit 201, such as pedestrians (children, adults, elderly people, etc.), vehicles (preceding vehicles, following vehicles, oncoming vehicles, motorcycles, and bicycles), or the like. Furthermore, the priority subject database for each scene 212 stores information regarding the required resolution or a subject to be preferentially subjected to distance computation according to a scene that can be recognized by the scene recognition unit 202, such as an intersection or a curve, a general road, a highway, a tunnel, night, traveling in rainy weather, heavy fog, or snow. Furthermore, the priority subject database for each traveling situation 213 stores information regarding the required resolution or a subject to be preferentially subjected to distance computation according to the traveling situation of the subject vehicle recognized by the traveling situation recognition unit 203, such as the charge amount or the vehicle speed, or the steering angle of the steering wheel.

Accordingly, the selection unit 204 can refer to the urgency database for each subject 211 to determine the required resolution or the urgency for each type of object recognized by the object recognition unit 201, predict the required resolution or the object to be preferentially recognized for each scene recognized by the scene recognition unit 202, or recognize the required resolution or the object to be preferentially recognized for each traveling situation of the subject vehicle recognized by the traveling situation recognition unit 203, so as to appropriately select the measurement target and the computation accuracy. When the selection unit 204 selects a measurement target, the computation area to be subjected to distance computation in the distance computing unit 206 is determined. Furthermore, the selection unit 204 also selects the computation accuracy together with the computation area to be subjected to distance computation. Selection of the computation accuracy includes selecting the speed, the distance, or the resolution of the antenna in the computation area to be subjected to FFT analysis in the FCM mode, or selecting any one from a plurality of computation modes having different computation accuracies, such as the FCM mode and the FMCW mode.

Furthermore, the selection unit 204 may use the presentation unit 207 to present information regarding the selected measurement target and the computation accuracy to a passenger of the subject vehicle such as the driver. Furthermore, in a case where an instruction regarding the measurement target is inputted by a passenger of the subject vehicle such as the driver via the input unit 208, the selection unit 204 may change the selection of the measurement target according to the instruction. Furthermore, in a case where the traveling situation recognition unit 203 recognizes the traveling situation that the required power is insufficient on the basis of the operating status of the air conditioner, the residual quantity of the vehicle-mounted battery, or the like, the selection unit 204 may use the presentation unit 207 to issue a warning to a passenger of the subject vehicle such as the driver, or notify the main control unit 209. The main control unit 209 may prompt processing for extending the operating time of distance computation such as stopping the air conditioner.

Note that the learning function may be incorporated into the urgency database for each subject 211, the priority subject database for each scene 212, and the priority subject database for each traveling situation 213, and data stored in databases 211 to 213 may be updated on the basis of the result of selection by the selection unit 204.

The planning unit 205 estimates the computation capacity of the distance computing unit 206 to compute the distance and the relative speed of the object by the FCM mode, and the computation load according to the recognition target, and makes a plan for the computation order of the measurement targets selected by the selection unit 204. Furthermore, the planning unit 205 may plan the computation order of the measurement targets on the basis of the situation such as the power consumption amount or the surplus electric power amount. The planning unit 205 omits the distance computation of the measurement target for which there is no margin in the computation capacity or the electric power amount to ensure that the distance computation is performed for an urgent measurement target. On the contrary, if there is a margin in the computation capacity or the electric power amount, the planning unit 205 may increase the number of measurement targets to further secure the safety. When planning the computation order of the measurement targets, the planning unit 205 may appropriately refer to the required computation amount database for each measurement target 214, which stores information regarding the required computation amount for each measurement target. The required computation amount database 214 stores information regarding the computation amount required for carrying out the distance computation for each measurement target. In a case where it is assumed that the computation accuracy or the computation mode is switched, the required computation amount database 214 may store the required computation amount according to the computation accuracy or the computation mode for each measurement target.

Furthermore, when determining that the measurement target selected by the selection unit 204 exceeds the computation capacity of the distance computing unit 206, the planning unit 205 may use the presentation unit 207 to issue a warning to a passenger of the subject vehicle such as the driver. Furthermore, the planning unit 205 may instruct the main control unit 209 to lower the vehicle speed of the subject vehicle in order to reduce the computation load of the distance computing unit 206. Furthermore, the planning unit 205 may use the presentation unit 207 to present information regarding a subject for which distance computation is not carried out due to the computation capacity to a passenger of the subject vehicle such as the driver.

Note that the learning function may be incorporated into the required computation amount database for each measurement target 214, and data stored in the required computation amount database for each measurement target 214 may be updated on the basis of the plan made by the planning unit 205.

The distance computing unit 206 carries out distance computation from the sensor signal of the radar 224 to the object according to the computation order planned by the planning unit 205 and limited by the measurement target selected by the selection unit 204. The distance computing unit 206 employs at least the FCM mode. The FCM mode is a mode of detecting the distance to the target and the relative speed by performing two times of FFT processing (two-dimensional FFT processing) on a beat signal for each chirp wave generated from the transmitted signal that generates a chirp wave whose frequency continuously increases or decreases, and the received signal of the reflected wave of the chirp wave from the target. In this case, the distance computing unit 206 carries out the distance computation by the FCW mode with a resolution corresponding to the computation accuracy selected by the selection unit 204. Furthermore, the distance computing unit 206 may employ both the FCM mode and the FMCW mode, and may switch to the computation accuracy or the computation mode selected by the selection unit 204 to carry out the distance computation. Then, the distance computing unit 206 outputs information regarding the calculated distance and the relative speed of each object to the main control unit 209.

The main control unit 209 utilizes the result of calculation by the distance computing unit 206 for vehicle control such as automatic driving or the ADAS. The main control unit 209 carries out vehicle control for automatic driving or the ADAS such as inter-vehicle control (ACC), lane departure warning (LDW), lane keep assist (LKA), automatic emergency braking (AEB), or blind spot detection (BSD), for example, and further controls the drive of each drive unit such as the active cornering light (ACL), the brake actuator (BRK), or the steering device (STR).

Figure 3:
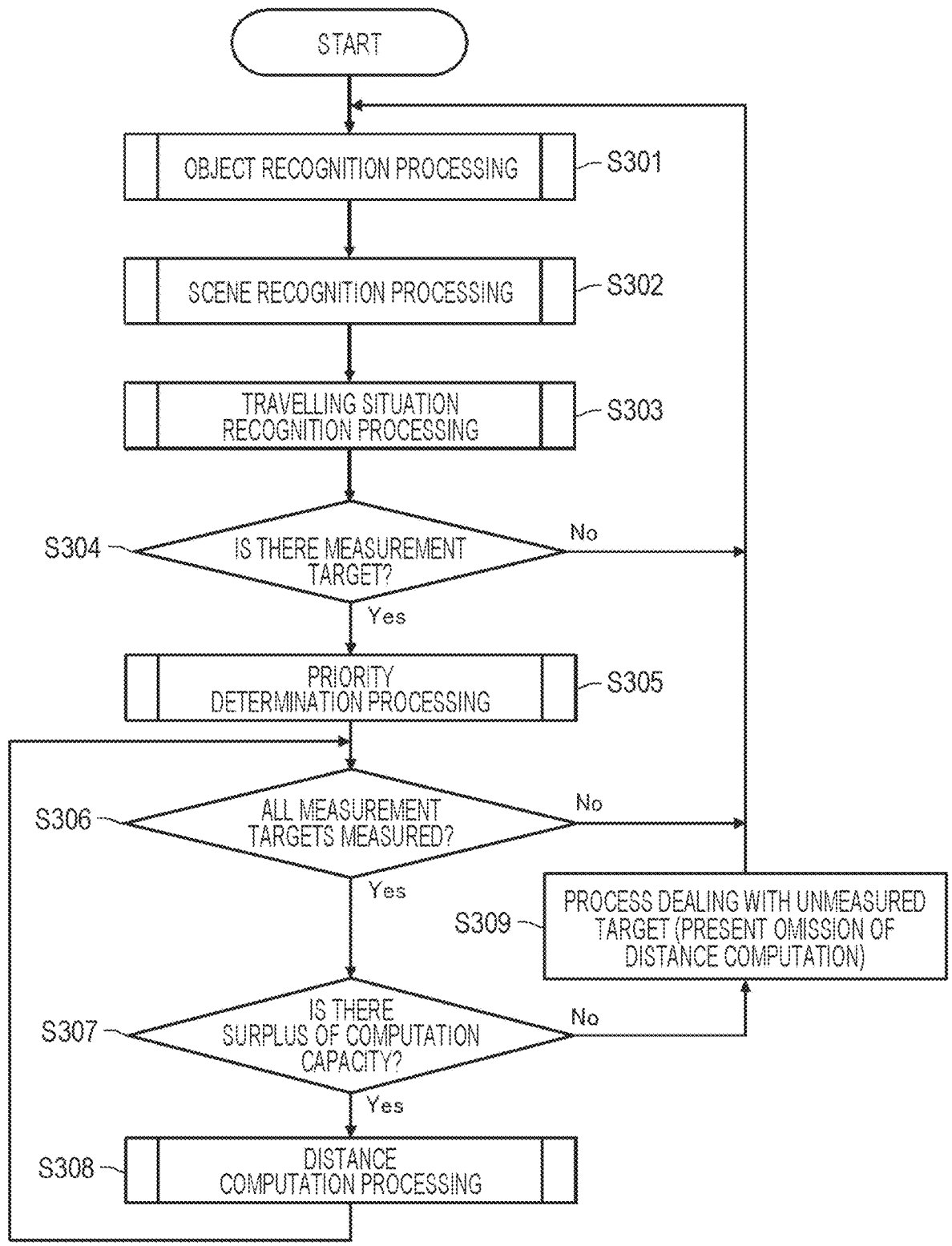
FIG. 3 is a flowchart illustrating an example of a processing procedure to be executed by the information processing system 100.

FIG. 3 illustrates an example of the processing procedure to be executed by the information processing system 100 in the form of a flowchart. The illustrated processing procedure is implemented when each unit in the information processing system 100 operates under the control of the main control unit 209.

First, the object recognition unit 201 performs image recognition of the image captured by the camera 221 and also performs object recognition on the basis of the detection signal of the LiDAR 222 (step S301). The object recognition unit 201 carries out sensor fusion processing as necessary.

Furthermore, the scene recognition unit 202 recognizes the scene encountered by the subject vehicle on the basis of the image captured by the camera 221, the detection signal of the LiDAR 222, or the result of object recognition by the object recognition unit 201 (step S302). The scene recognition unit 202 carries out sensor fusion processing as necessary.

Furthermore, the traveling situation recognition unit 203 inputs a sensor signal from the vehicle body sensor 223 to recognize the traveling situation of the subject vehicle (step S303).

However, the object recognition processing by the object recognition unit 201, the scene recognition processing by the scene recognition unit 202, and the traveling situation recognition processing by the traveling situation recognition unit 203 are in no particular order, and these three processing may be simultaneously carried out in parallel.

Next, the selection unit 204 checks whether there is a measurement target to be subjected to distance computation by the distance computing unit 206 from the sensor signal of the radar 224 or not on the basis of the result of object recognition by the object recognition unit 201, the result of scene recognition by the scene recognition unit 202, and the result of traveling situation recognition by the traveling situation recognition unit 203 (step S304). When selecting the measurement target, the selection unit 204 appropriately refers to the urgency database for each subject 211, the priority subject database for each scene 212, and the priority subject database for each traveling situation 213 as necessary. Furthermore, the selection unit 204 may also select the computation accuracy or the computation mode for carrying out distance computation for the selected measurement target.

In a case where there is no measurement target to be subjected to distance computation (No in step S304), the processing returns to step S301, and the object recognition processing, the scene recognition processing, and the traveling situation recognition processing are repeatedly carried out to try to find the measurement target.

Furthermore, in a case where there is a measurement target to be subjected to distance computation (Yes in step S304), the planning unit 205 performs priority determination for carrying out distance computation for each measurement target detected through the recognition processing S301 to S303 described above (step S305). After that, the distance computation for each measurement target is sequentially tried according to the determined priority.

The planning unit 205 estimates the computation capacity of the distance computing unit 206 to compute the distance and relative speed of the object by the FCM mode and the computation load according to the recognition target, and checks whether the distance computing unit 206 (or information processing system 200) has a sufficient surplus of computation capacity or not (step S307). At that time, the planning unit 205 appropriately refers to the required computation amount database for each measurement target 214. Furthermore, in a case where the selection unit 204 also selects the computation accuracy or the computation mode for carrying out distance computation for the measurement target, whether there is a surplus of computation capacity according to the computation accuracy or the computation mode or not is checked in step S307.

In a case where there is a sufficient surplus of computation capacity (Yes in step S307), the distance computing unit 206 computes the distance and the relative speed of the object by the FCM mode for the next measurement target (step S308). Then, the distance computing unit 206 shall carry out distance computation in the computation area and at the computation accuracy selected by the selection unit 204. However, in a case where an arbitrary computation mode can be selected, the distance and the relative speed of the object are computed by the computation mode selected by the selection unit 204.

Thereafter, in a case where a measurement target still remains (No in step S306), checking of the computation capacity (step S307), and distance computation for the measurement target (step S308) are repeatedly carried out.

In a case where the distance and the relative speed are measured for all the measurement targets (Yes in step S306), the processing returns to step S301, and the object recognition processing, the scene recognition processing, and the traveling situation recognition processing are repeatedly carried out to try to find a newly appearing measurement target.

Furthermore, in a case where the distance computing unit 206 (or information processing system 200) does not have a sufficient surplus of computation capacity (No in step S307), the planning unit 205 gives up the distance computation for the remaining measurement targets. Alternatively, in a case where there is not a sufficient surplus of computation capacity, the computation accuracy may be given up, and the FCM mode may be switched to the FMCW mode for the subsequent measurement targets to compute the distance and the relative speed of the object. Then, as a countermeasure for not measuring the distance and the relative speed for the remaining measurement targets, the presentation unit 207 is used to present to a passenger of the subject vehicle such as the driver that the measurement has been omitted (step S309). When the computation mode used by the distance computing unit 206 is switched, the fact may be presented. Thereafter, the processing returns to step S301, and the object recognition processing, the scene recognition processing, and the traveling situation recognition processing are repeatedly carried out to try to find the measurement target.

Figure 4:
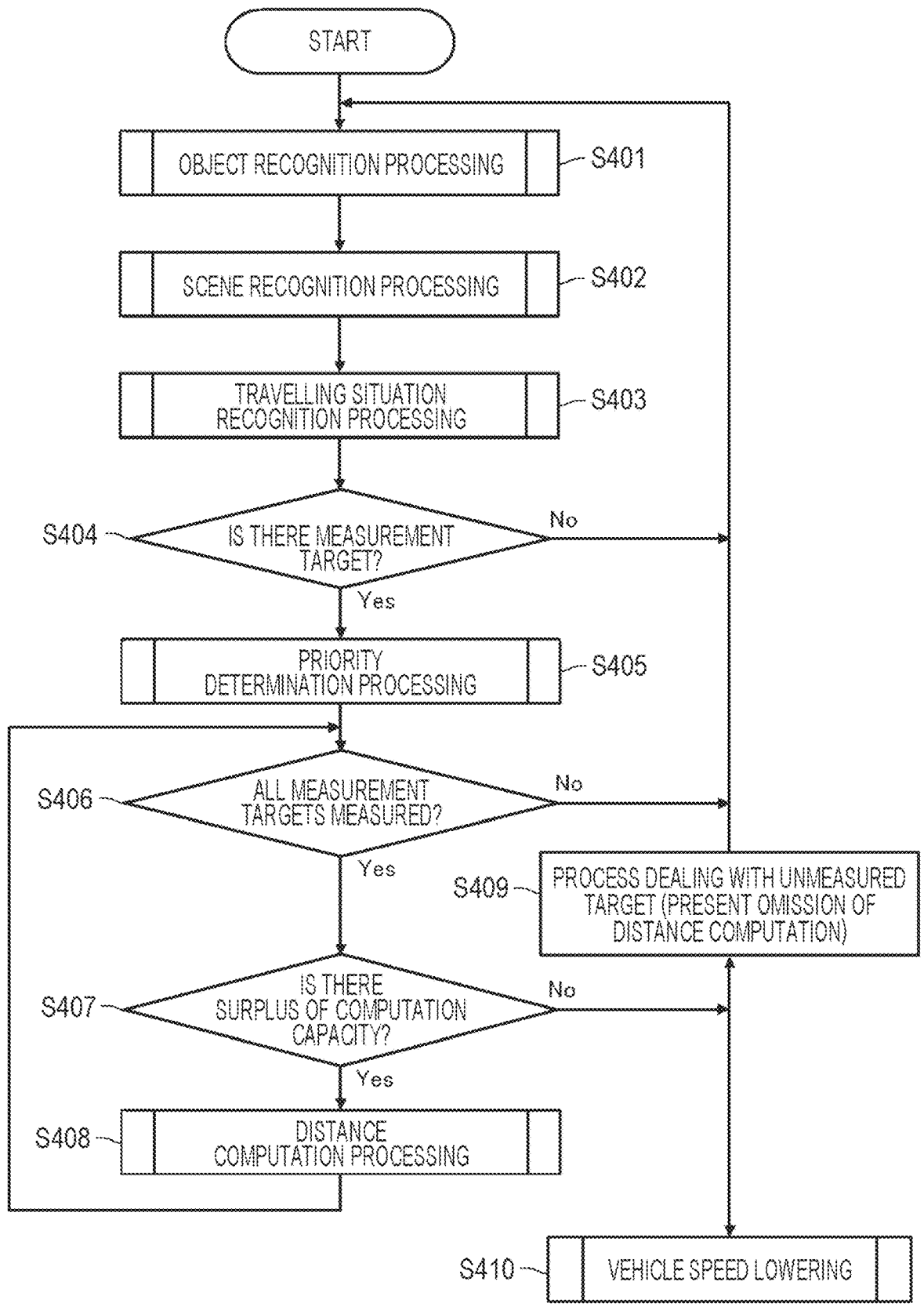
FIG. 4 is a flowchart illustrating another example of a processing procedure to be executed by the information processing system 100.

FIG. 4 illustrates another example of the processing procedure to be executed by the information processing system 100 in the form of a flowchart. The illustrated processing procedure is implemented when each unit in the information processing system 100 operates under the control of the main control unit 209.

First, the object recognition unit 201 performs image recognition of an image captured by the camera 221, and also performs object recognition on the basis of the detection signal of the LiDAR 222 (step S401). Furthermore, the scene recognition unit 202 recognizes the scene encountered by the subject vehicle on the basis of the image captured by the camera 221, the detection signal of the LiDAR 222, or the result of object recognition by the object recognition unit 201 (step S402). Sensor fusion processing may be appropriately incorporated in each processing of object recognition and scene recognition.

Furthermore, the traveling situation recognition unit 203 inputs a sensor signal from the vehicle body sensor 223 to recognize the traveling situation of the subject vehicle (step S403). However, the object recognition processing by the object recognition unit 201, the scene recognition processing by the scene recognition unit 202, and the traveling situation recognition processing by the traveling situation recognition unit 203 are in no particular order, and these three processing may be simultaneously carried out in parallel.

Next, the selection unit 204 checks whether there is a measurement target to be subjected to distance computation by the distance computing unit 206 from the sensor signal of the radar 224 or not on the basis of the result of object recognition by the object recognition unit 201, the result of scene recognition by the scene recognition unit 202, and the result of traveling situation recognition by the traveling situation recognition unit 203 (step S404). When selecting the measurement target, the selection unit 204 appropriately refers to the urgency database for each subject 211, the priority subject database for each scene 212, and the priority subject database for each traveling situation 213 as necessary. Furthermore, the selection unit 204 may also select the computation accuracy or the computation mode for carrying out distance computation for the selected measurement target.

In a case where there is no measurement target to be subjected to distance computation (No in step S304), the processing returns to step S401, and the processing described above is repeated to try to find the measurement target.

On the other hand, in a case where there is a measurement target to be subjected to distance computation (Yes in step S304), the planning unit 205 determines the priority for carrying out the distance computation for each of the detected measurement targets (step S405). After that, the distance computation of each measurement target is sequentially tried according to the determined priority.

The planning unit 205 estimates the computation capacity of the distance computing unit 206 to compute the distance and the relative speed of the object by the FCM mode, and the computation load according to the recognition target, and checks whether the distance computing unit 206 has a sufficient surplus of computation capacity or not (step S407). Furthermore, in a case where the selection unit 204 also selects the computation accuracy or the computation mode for carrying out distance computation for the measurement target, whether there is a surplus of computation capacity according to the computation accuracy or the computation mode or not is checked in step S407. Then, in a case where there is a sufficient surplus of computation capacity (Yes in step S407), the distance computing unit 206 computes the distance and the relative speed of the object by the FCM mode for the next measurement target (step S408). Assume that the distance computing unit 206 carries out the distance computation in the computation area and at the computation accuracy selected by the selection unit 204. However, in a case where an arbitrary computation mode can be selected, the distance and the relative speed of the object are computed by the computation mode selected by the selection unit 204.

Thereafter, in a case where a measurement target still remains (No in step S406), confirmation of the computation capacity (step S407) and distance computation for the measurement target (step S408) are repeatedly carried out. Furthermore, in a case where the distance and the relative speed are measured for all the measurement targets (Yes in step S406), the processing returns to step S401, and the processing described above is repeated to try to find a newly appearing measurement target.

On the other hand, in a case where the distance computing unit 206 does not have a sufficient surplus of computation capacity (No in step S407), the planning unit 205 gives up distance computation for the remaining measurement targets. Alternatively, in a case where there is not a sufficient surplus of computation capacity, the computation accuracy may be given up, and the FCM mode may be switched to the FMCW mode for the subsequent measurement targets to compute the distance and the relative speed of the object. Then, the main control unit 209 instructs the operation control unit 135 to lower the vehicle speed of the subject vehicle in order to reduce the computation load of the distance computing unit 206 (step S410). When the vehicle speed lowers, the number of objects per unit time recognized by the object recognition unit 201 decreases, or the change per unit time of the scene recognized by the scene recognition unit 202 decreases, and the number of measurement targets selected by the selection unit 204 also decreases, and therefore it is expected that the computation load will be reduced.

Furthermore, the planning unit 205 uses the presentation unit 207 to inform a passenger of the subject vehicle such as the driver that the measurement has been omitted, as a countermeasure for not measuring the distance and the relative speed for the remaining measurement targets (step S409). When the computation mode used by the distance computing unit 206 is switched, the fact may be presented. Thereafter, the processing returns to step S401, and the object recognition processing, the scene recognition processing, and the traveling situation recognition processing are repeatedly carried out to try to find a measurement target.

Figure 5:
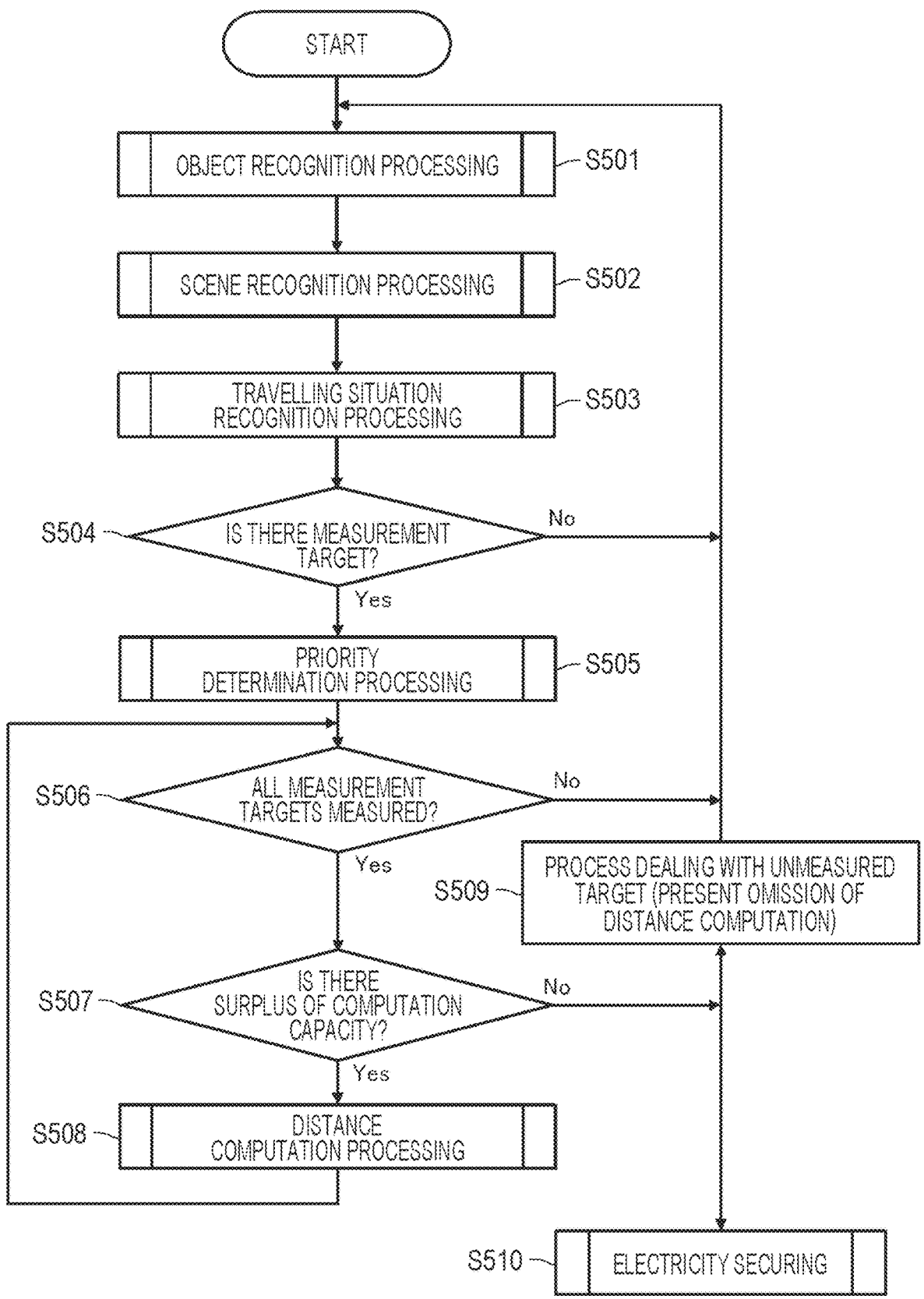
FIG. 5 is a flowchart illustrating still another example of a processing procedure to be executed by the information processing system 100.

FIG. 5 illustrates yet another example of the processing procedure to be executed by the information processing system 100 in the form of a flowchart. The illustrated processing procedure is implemented when each unit in the information processing system 100 operates under the control of the main control unit 209.

First, the object recognition unit 201 performs image recognition of an image captured by the camera 221, and also performs object recognition on the basis of the detection signal of the LiDAR 222 (step S501). Furthermore, the scene recognition unit 202 recognizes the scene encountered by the subject vehicle on the basis of the image captured by the camera 221, the detection signal of the LiDAR 222, or the result of object recognition by the object recognition unit 201 (step S502). Sensor fusion processing may be appropriately incorporated in each processing of object recognition and scene recognition.

Furthermore, the traveling situation recognition unit 203 inputs a sensor signal from the vehicle body sensor 223 to recognize the traveling situation of the subject vehicle (step S503). However, the object recognition processing by the object recognition unit 201, the scene recognition processing by the scene recognition unit 202, and the traveling situation recognition processing by the traveling situation recognition unit 203 are in no particular order, and these three processing may be simultaneously carried out in parallel.

Next, the selection unit 204 checks whether there is a measurement target to be subjected to distance computation by the distance computing unit 206 from the sensor signal of the radar 224 or not on the basis of the result of object recognition by the object recognition unit 201, the result of scene recognition by the scene recognition unit 202, and the result of traveling situation recognition by the traveling situation recognition unit 203 (step S504). When selecting the measurement target, the selection unit 204 appropriately refers to the urgency database for each subject 211, the priority subject database for each scene 212, and the priority subject database for each traveling situation 213 as necessary. Furthermore, the selection unit 204 may also select the computation accuracy or the computation mode for carrying out distance computation for the selected measurement target.

In a case where there is no measurement target to be subjected to distance computation (No in step S504), the processing returns to step S501, and the processing described above is repeated to try to find the measurement target.

On the other hand, in a case where there is a measurement target to be subjected to distance computation (Yes in step S504), the planning unit 205 determines the priority for carrying out the distance computation for each of the detected measurement targets (step S505). After that, the distance computation of each measurement target is sequentially tried according to the determined priority.

The planning unit 205 estimates the computation capacity of the distance computing unit 206 to compute the distance and the relative speed of the object by the FCM mode, and the computation load according to the recognition target, and checks whether the distance computing unit 206 has a sufficient surplus of computation capacity or not (step S507). Furthermore, in a case where the selection unit 204 also selects the computation accuracy or the computation mode for carrying out distance computation for the measurement target, whether there is a surplus of computation capacity according to the computation accuracy or the computation mode or not is checked in step S507. Then, in a case where there is a sufficient surplus of computation capacity (Yes in step S507), the distance computing unit 206 computes the distance and the relative speed of the object by the FCM mode for the next measurement target (step S508). Assume that the distance computing unit 206 carries out the distance computation in the computation area and at the computation accuracy selected by the selection unit 204. However, in a case where an arbitrary computation mode can be selected, the distance and the relative speed of the object are computed by the computation mode selected by the selection unit 204.

Thereafter, in a case where a measurement target still remains (No in step S506), confirmation of the computation capacity (step S507) and distance computation for the measurement target (step S508) are repeatedly carried out. Furthermore, in a case where the distance and the relative speed have been measured for all the measurement targets (Yes in step S506), the processing returns to step S501, and the processing described above is repeated to try to find a newly appearing measurement target.

On the other hand, in a case where the distance computing unit 206 does not have a sufficient surplus of computation capacity (No in step S507), the planning unit 205 gives up distance computation for the remaining measurement targets. Alternatively, in a case where there is not a sufficient surplus of computation capacity, the computation accuracy may be given up, and the FCM mode may be switched to the FMCW mode for the subsequent measurement targets to compute the distance and the relative speed of the object. Then, the main control unit 209 instructs the body system control unit 109 and the like to secure electric power so that electric power for the computation processing of the distance computing unit 206 can be preferentially used (step S510). For example, in the body system 110, surplus electric power can be generated by suppressing the operation of the air conditioner (raising the setting of the cooling temperature, etc.). Furthermore, in a case where the subject vehicle is an electric vehicle, the drive system control unit 107 suppresses generation of the driving force of the drive motor (limits the speed or acceleration of the vehicle), so that surplus electric power can be generated.

Furthermore, the planning unit 205 uses the presentation unit 207 to inform a passenger of the subject vehicle such as the driver that the measurement has been omitted, as a countermeasure for not measuring the distance and the relative speed for the remaining measurement targets (step S509). When the processing mode of the radar device is switched, that fact may be presented. Thereafter, the processing returns to step S401, and the object recognition processing, the scene recognition processing, and the traveling situation recognition processing are repeatedly carried out to try to find a measurement target.

Figure 6:
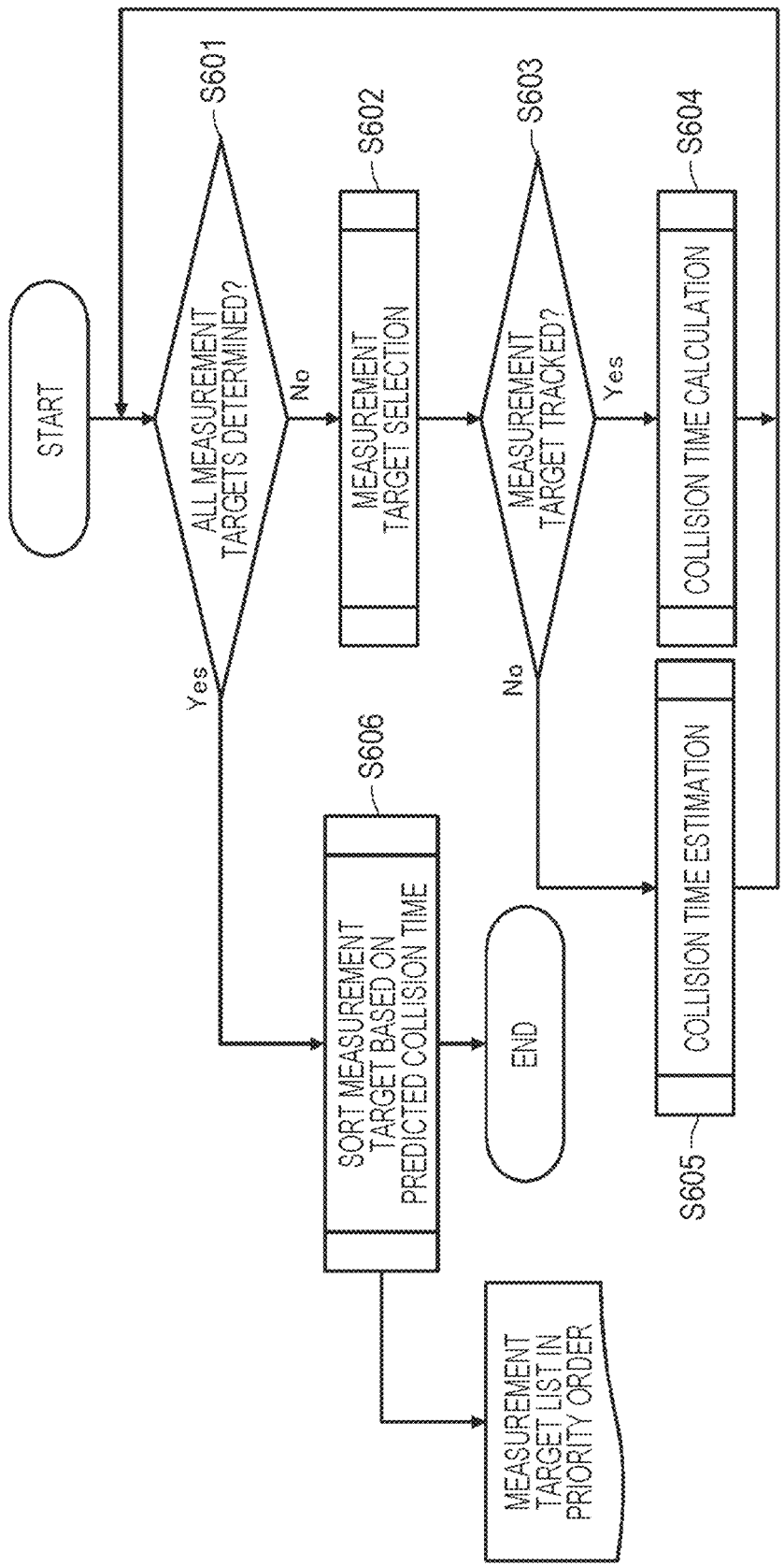
FIG. 6 is a flowchart illustrating a detailed processing procedure of priority determination processing of a measurement target.

FIG. 6 illustrates a detailed processing procedure of priority determination processing of the measurement target to be carried out in step S305 in the flowchart illustrated in FIG. 3, in the form of a flowchart. It should be understood that similar processing is carried out in step S405 in the flowchart illustrated in FIG. 4 and in step S505 in the flowchart illustrated in FIG. 5.

This priority determination processing is executed, for example, by the planning unit 205 in the information processing system 200. Furthermore, in the priority determination processing illustrated in FIG. 6, it is premised that a measurement target list in which the measurement targets are sorted in order of priority is used.

First, the following processing for determining the collision time is carried out for all the measurement targets detected through the object recognition, the scene recognition, and the traveling situation recognition S301 to S303 (No in step S601).

The planning unit 205 selects a measurement target in order of priority, for example, with reference to the measurement target list (described above) (step S602). Then, whether the selected measurement target has already been tracked or not is checked (step S603).

in a case where the selected measurement target has already been tracked (Yes in step S603), the collision time when the course of the subject vehicle and the trajectory of the measurement target intersect with each other and the subject vehicle and the measurement target collide is calculated on the basis of the tracking result (step S604). Furthermore, in a case where the selected measurement target has not been tracked yet (No in step S603), the trajectory of the measurement target is predicted according to a predetermined prediction algorithm, and the collision time of the subject vehicle and the measurement target is estimated (step S605). Note that the collision time of the measurement target that never collides is infinite.

Then, when the determination of the collision time for all the detected measurement targets is finished (Yes in step S601), the planning unit 205 sorts each measurement target on the basis of the expected collision time obtained in step S604 or S605 (step S606) and writes the measurement target into the measurement target list (described above), and this processing is terminated.

Note that processing of deleting a measurement target that is unlikely to collide with the subject vehicle, such as a measurement target whose collision time has already passed, from the measurement target list (described above) shall be separately performed.

Figure 7:
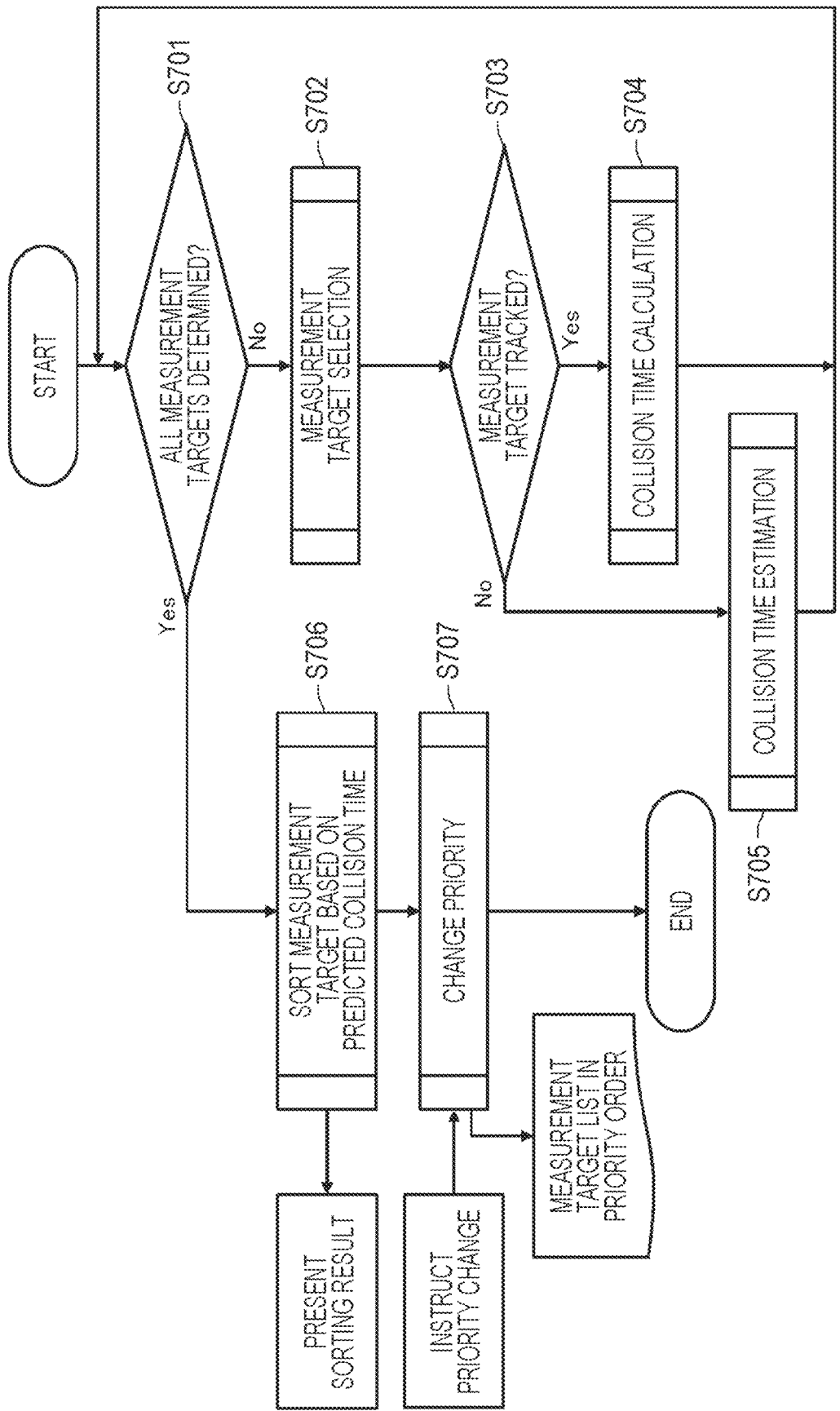
FIG. 7 is a flowchart illustrating a detailed processing procedure of priority determination processing of a measurement target.

FIG. 7 illustrates another example of a detailed processing procedure of priority determination processing of the measurement target to be carried out in step S305 in the flowchart illustrated in FIG. 3, in the form of a flowchart. It should be understood that similar processing is carried out in step S405 in the flowchart illustrated in FIG. 4 and in step S505 in the flowchart illustrated in FIG. 5.

First, the following processing for determining the collision time is carried out for all the measurement targets detected through the object recognition, the scene recognition, and the traveling situation recognition S301 to S303 (No in step S701).

The planning unit 205 selects a measurement target in order of priority, for example, with reference to the measurement target list (described above) (step S702). Then, whether the selected measurement target has already been tracked or not is checked (step S703). In a case where the selected measurement target has already been tracked (Yes in step S703), the collision time of the subject vehicle and the measurement target is calculated (step S704). Furthermore, in a case where the selected measurement target has not been tracked yet (No in step S703), the collision time of the subject vehicle and the measurement target is estimated (step S705). Note that the collision time of the measurement target that never collides is infinite.

Then, when the determination of the collision time for all the detected measurement targets is finished (Yes in step S701) and the planning unit 205 sorts each measurement target on the basis of the expected collision time obtained in step S704 or S705 (step S706), the sorting result of the measurement target is presented to a passenger of the subject vehicle such as the driver via the presentation unit 207.

The sorting result of the measurement target is displayed on the screen using, for example, a display device (described above). The passenger can use the input unit 208 to input an instruction to change the priority of the measurement target. The input unit 208 may be a user interface (UI) on the screen of a display device such as a touch panel, voice input, or the like. The planning unit 205 changes the priority of each measurement target according to the priority change instruction (step S707) and writes the priority into the measurement target list (described above), and this processing is terminated.

Figure 8:
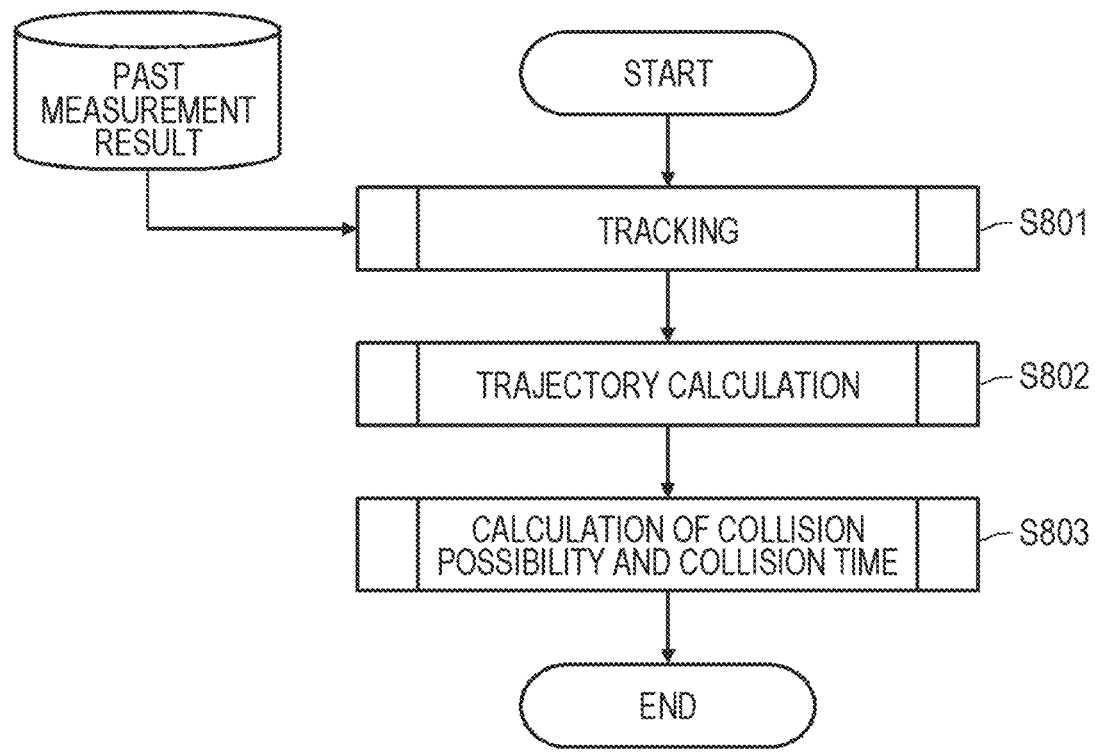
FIG. 8 is a flowchart illustrating a processing procedure for calculating a collision time of a vehicle and a measurement target.

FIG. 8 illustrates the processing procedure for calculating the collision time of the subject vehicle and the measurement target to be carried out in step S604 in the flowchart illustrated in FIG. 6, in the form of a flowchart. It should be understood that similar processing is carried out in step S704 in the flowchart illustrated in FIG. 7.

The planning unit 205 tracks the measurement target being processed on the basis of the past measurement result (step S801). Then, on the basis of the tracking result, the trajectory of the measurement target is calculated (step S802), the collision time when the course of the subject vehicle and the trajectory of the measurement target intersect with each other and the subject vehicle and the measurement target collide is calculated (step S803), and this processing is terminated.

Figure 9:
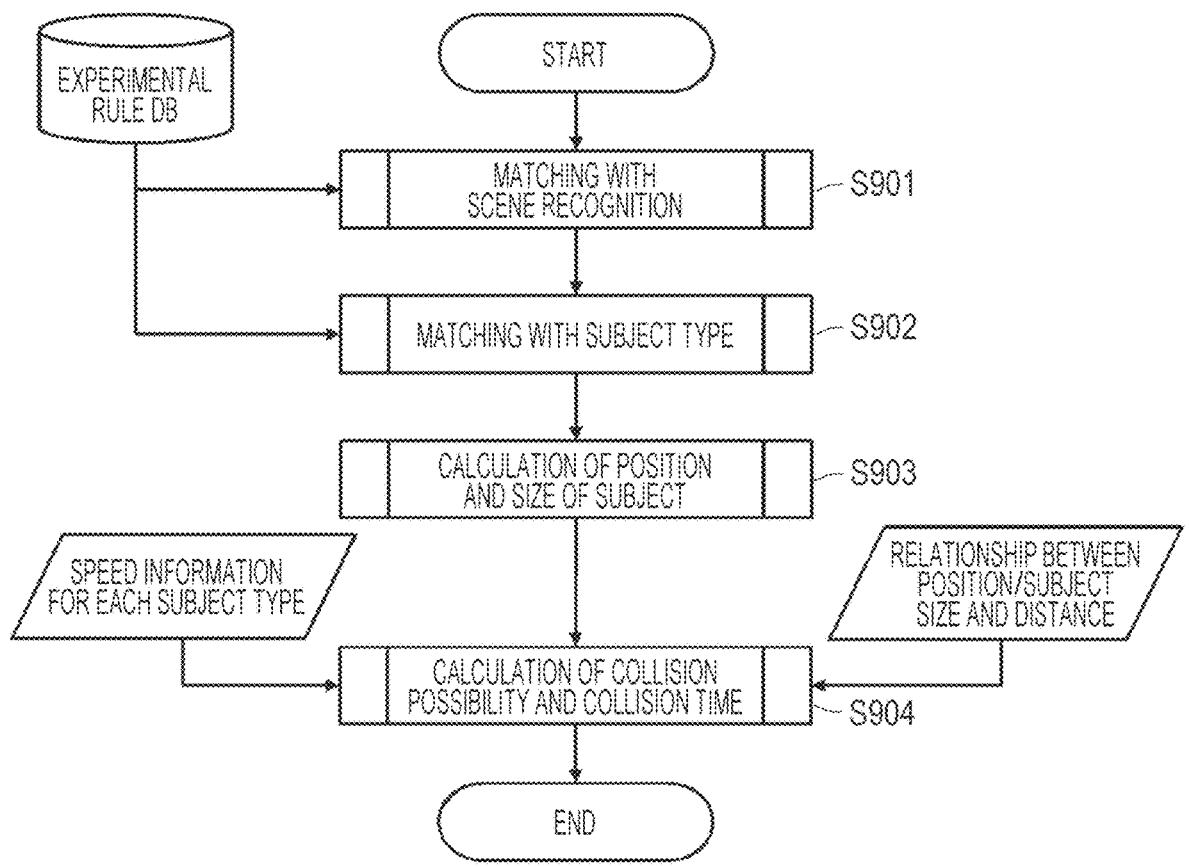
FIG. 9 is a flowchart illustrating a processing procedure for estimating a collision time of a vehicle and a measurement target.

FIG. 9 illustrates the processing procedure for estimating the collision time of the subject vehicle and the measurement target to be carried out in step S605 in the flowchart illustrated in FIG. 6, in the form of a flowchart. It should be understood that similar processing is carried out in step S605 in the flowchart illustrated in FIG. 7.

First, the planning unit 205 performs matching with the result of scene recognition by the scene recognition unit 202 (step S901) and matching with the subject type of the measurement target (step S902). In these matching processing, collation with experimental rule database is appropriately performed as necessary. These matching processing is carried out so that an object that clearly does not require distance computation (e.g., object that is extremely unlikely to collide) among the objects selected as measurement targets by the selection unit 204 through the recognition processing steps S301 to 303 (or steps S401 to 403) is excluded, or conversely, an object that requires distance computation (e.g., object that is extremely likely to collide) is extracted.

Next, the planning unit 205 calculates the position information and the size of the object to be measured (step S903). Then, the planning unit 205 verifies the possibility that the object collides with the subject vehicle on the basis of the speed information for each subject type, the relationship between the position and the size of the object and the distance, and also calculates the collision time (step S904), and this processing is terminated.

Figure 10:
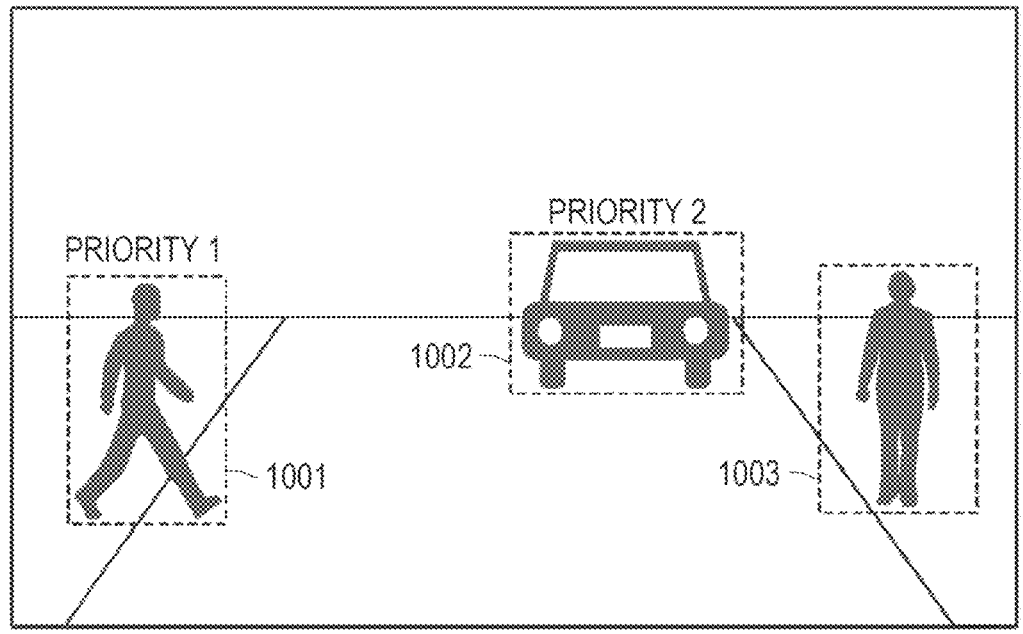
FIG. 10 is a diagram illustrating a configuration example of a screen displaying the sorting result of a measurement target.

FIG. 10 illustrates a configuration example of a screen in which the sorting result of the measurement target is displayed using the display device (described above) in step S706 in the flowchart illustrated in FIG. 7. In the example illustrated in FIG. 10, the sorting result is displayed on a screen showing the scenery in front of the subject vehicle. However, a head-up display in which the result is displayed not on a screen but on the windshield of the subject vehicle may be employed.

In FIG. 10, reference numerals 1001 to 1003 are objects recognized by the object recognition unit 201. As illustrated in the figure, each recognized object may be surrounded by a square or the like to indicate that it is recognized. The object 1001 is a pedestrian who is about to jump out in front of the subject vehicle. Furthermore, the object 1002 is a preceding vehicle traveling in front of the subject vehicle, and the distance from the subject vehicle is gradually becoming shorter. Furthermore, the object 1003 is a pedestrian standing on the sidewalk.

The pedestrian 1001 who is about to jump out in front of the subject vehicle, or the approaching preceding vehicle 1002 may collide with the subject vehicle in the near future. On the other hand, the stationary pedestrian 1003 is extremely unlikely to collide with the subject vehicle. Thus, the selection unit 204 selects only the object 1001 and the object 1002 among the recognized objects as measurement targets. Furthermore, the planning unit 205 assigns priorities 1 and 2 respectively to the objects 1001 and 1002 selected by the selection unit 204, and respectively displays the priorities in a frame surrounding each object. As a result, a passenger of the subject vehicle such as the driver can know that distance measurement for the pedestrian 1001 who is about to walk on the roadway and the vehicle 1002 in front is performed with high priority. It also prompts the driver to lower the vehicle speed in order to avoid collision with the pedestrian 1001 or the vehicle 1002 in front.

Figure 11:
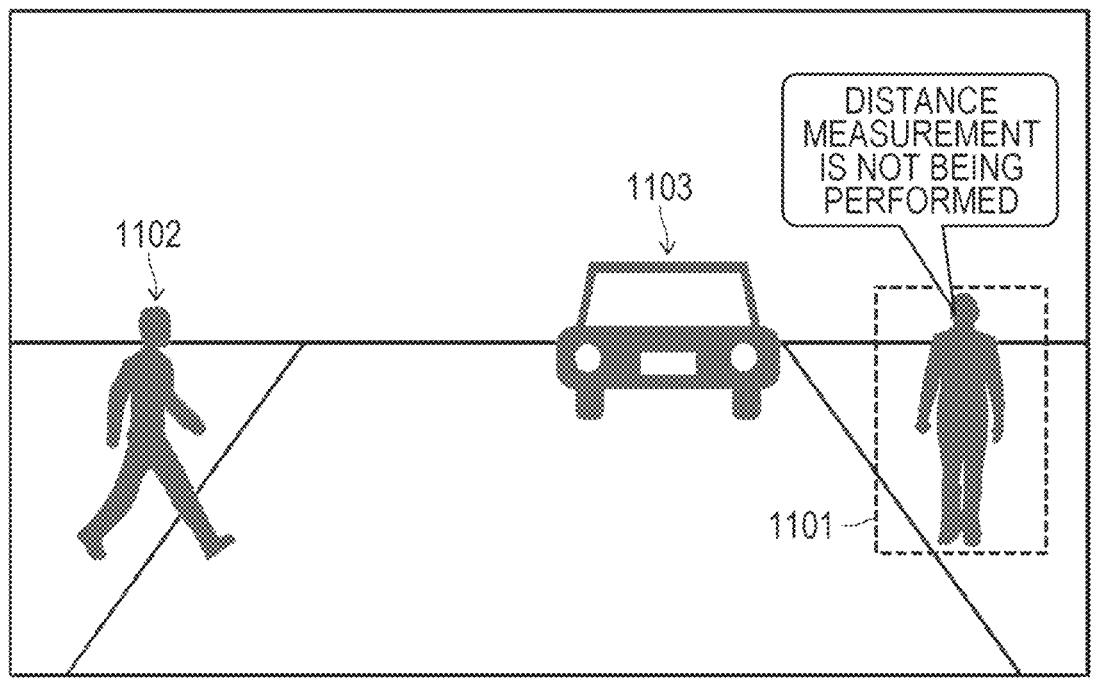
FIG. 11 is a diagram illustrating a configuration example of a screen displaying a measurement target without distance computation.

FIG. 11 illustrates a configuration example of a screen in which the measurement target for which distance computation has been omitted is displayed using the display device (described above) as a countermeasure for not measuring the distance and the relative speed of the measurement target in step S309 in the flowchart illustrated in FIG. 3. It should be understood that similar screen display is carried out in step S409 in the flowchart illustrated in FIG. 4 and in step S509 in the flowchart illustrated in FIG. 5. Furthermore, in the example illustrated in FIG. 11, the measurement target for which the distance computation has been omitted is displayed on a screen showing the scenery in front of the subject vehicle. However, a head-up display in which the result is displayed not on a screen but on the windshield of the subject vehicle may be employed.

In FIG. 11, reference numeral 1101 is an object that is not selected by the selection unit 204 as the measurement target or is excluded from the distance measurement target by the planning unit 205 among objects recognized by the object recognition unit 201. This object 1101 is a pedestrian standing on the sidewalk. Since the pedestrian indicated by the reference numeral 1102 or the vehicle in front indicated by the reference numeral 1103 may collide with the subject vehicle in the near future, the pedestrian 1102 and the vehicle 1103 are selected as distance measurement targets and incorporated into the distance computation plan. On the other hand, since the stationary pedestrian 1101 is extremely unlikely to collide with the subject vehicle, the pedestrian 1101 is not selected as the distance measurement target, or is excluded from the distance computation plan in a case where there is not a sufficient surplus of computation capacity. As illustrated in the figure, the selection unit 204 or the planning unit 205 displays on the screen that distance measurement is not being performed for the pedestrian 1103. Note that, in addition to the screen display (or instead of the screen display), the presentation unit 207 may present by voice message that the pedestrian 1101 is not the distance measurement target. When the pedestrian 1101 suddenly starts to move, the driver is also prompted to lower the vehicle speed in order to avoid collision with the pedestrian 1101.

Figure 12:
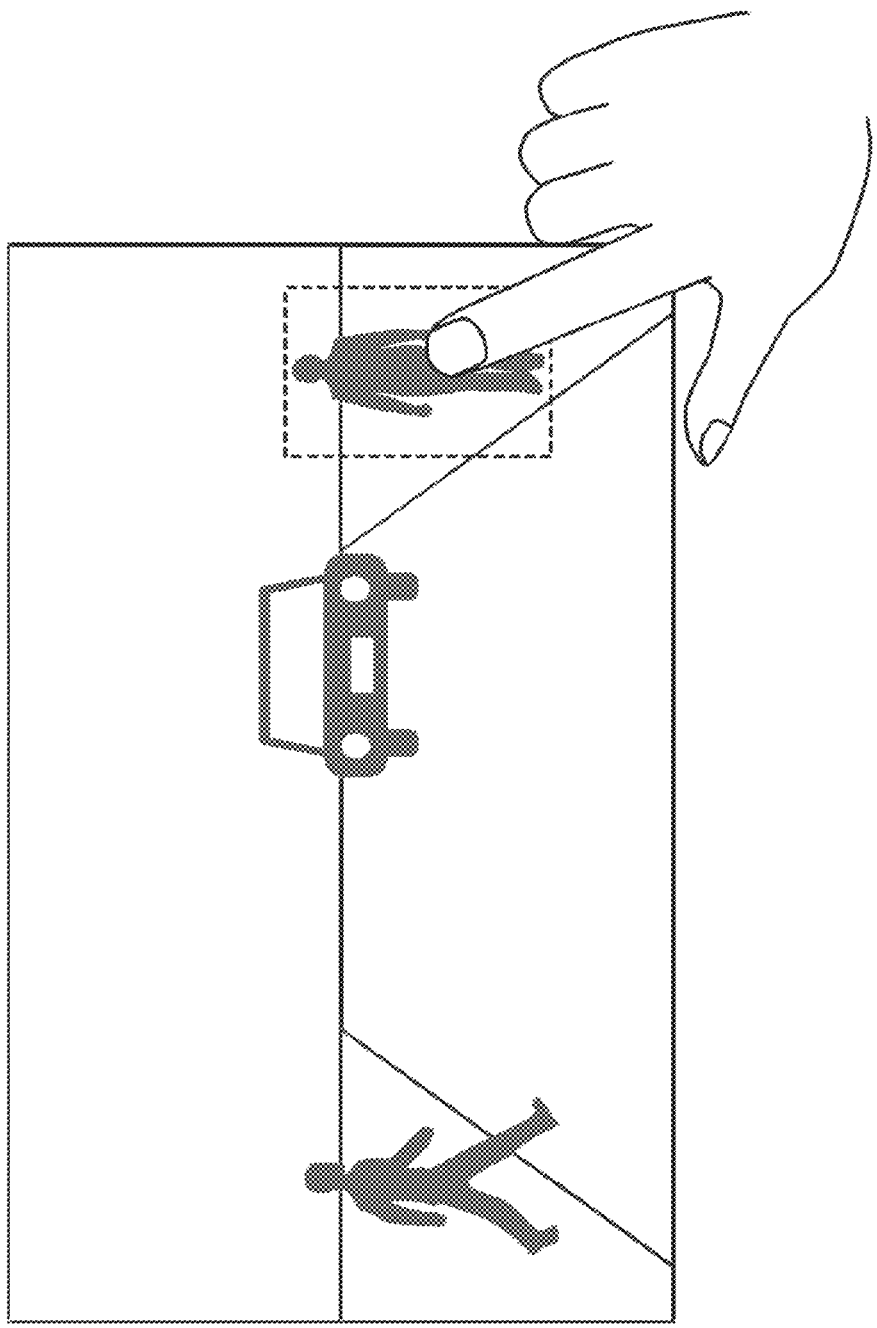
FIG. 12 is a diagram illustrating a state in which change of a measurement target is instructed on the screen illustrated in FIG. 11.

FIG. 12 illustrates how to instruct change of the measurement target. For example, on the screen illustrated in FIG. 11, a passenger of the subject vehicle such as the driver can use the UI of the screen of a display device such as a touch panel to touch a measurement target, for which measurement of the distance and the relative speed is not performed, with a fingertip so as to instruct the planning unit 205 to treat the object as the measurement target.

For example, in step S707 in the flowchart illustrated in FIG. 7, the planning unit 205 responds to the driver instructing to add the measurement target to the distance measurement target or raise the priority of the measurement target, so as to write the measurement target into the measurement target list or change the priority. Furthermore, in step S309 in the flowchart illustrated in FIG. 3, step S409 in the flowchart illustrated in FIG. 4, or step S509 in the flowchart illustrated in FIG. 5, the driver may also instruct to add an object excluded from the measurement target to the measurement target through the screen illustrated in FIG. 12.

Finally, the effect of the information processing system 200 according to the present embodiment will be mentioned. The information processing system 200 can be suitably applied to a device that performs measurement by using a radar device in combination with another object detection sensor such as a camera or a LiDAR. A specific example of this type of device is the vehicle control system 100 that implements the ADAS or automatic driving.

By applying radar processing of FCM mode to a radar device, range resolution or detection of the speed of a target object can be expanded, while the amount of calculation increases, which causes a problem that the cost or the power consumption of the arithmetic circuit increases (mentioned above). By applying the information processing system 200 according to the present embodiment, there is an advantage that the computation amount in the radar processing of FCM mode can be reduced, or the same amount of calculation can correspond to a plurality of applications. Furthermore, the total computation amount required can be reduced by switching the computation method by time division.

That is, it is possible with the information processing system 200 according to the present embodiment to manage the processing mode of the radar device according to the priority of the measurement target. Accordingly, it is possible to enhance the safety of the ADAS or automatic driving in the vehicle control system 100 even with an inexpensive device configuration.

It is clear that, in the information processing system 200 according to the present embodiment, it is possible to implement upgrading such as increasing the number of measurement targets for distance computation using a radar device and further enhancing the safety by strengthening the computation capacity.

INDUSTRIAL APPLICABILITY

The technology disclosed in the present specification has been described above in detail with reference to a specific embodiment. However, it is obvious that a person skilled in the art can make modifications or substitutions of the embodiment without departing from the gist of the technology disclosed in this specification.

Although this specification has focused on the embodiment relating to fusion of a vehicle-mounted sensor, the scope of application of the technology disclosed herein is not limited to vehicles. For example, the technology disclosed in this specification can be similarly applied to various types of mobile devices, such as an unmanned aerial vehicle such as a drone, a robot that autonomously moves in a given workspace (home, office, factory, etc.), a ship, or an aircraft. It is clear that the technology disclosed in this specification can be similarly applied to an information terminal installed in a mobile device, or various non-mobile devices.

In short, the technology disclosed in this specification has been described in the form of exemplification, and the contents described in the present specification should not be interpreted in a limited manner. To determine the gist of the technology disclosed in this specification, the claims should be taken into consideration.

Note that the technology disclosed in this specification may also have the following configurations.

(1) An information processing device including:
a processing unit that performs computation processing of a detection signal of a radar of FCM mode; and
a control unit that controls the computation processing mode in the processing unit on the basis of the detection result of another sensor, (2) The information processing device according to (1) described above,
in which the radar is mounted on a vehicle and used, and the another sensor is a vehicle-mounted sensor of the same vehicle.

(3) The information processing device according to (1) or (2) described above,
in which the control unit controls at least one of the computation area or the computation accuracy of computation processing in the processing unit on the basis of the detection result of the another sensor.

(4) The information processing device according to any one of (1) to (3) described above,
in which the control unit selects a target to be subjected to computation processing by the processing unit on the basis of the detection result of the another sensor.

(5) The information processing device according to (4) described above,
in which the control unit selects a target to be subjected to computation processing by the processing unit on the basis of the result of object recognition by the another sensor.

(5-1) The information processing device according to (5) described above,
in which the control unit selects the target on the basis of urgency of each object.

(6) The information processing device according to (4) or (5) described above,
in which the information processing device is applied to a vehicle, and
the control unit selects a target to be subjected to computation processing by the processing unit on the basis of a scene encountered by the vehicle recognized by the another sensor.

(6-1) The information processing device according to (6) described above,
in which the control unit selects the target on the basis of priority for each scene.

(7) The information processing device according to any one of (4) to (6) described above,
in which the information processing device is applied to a vehicle, and
the control unit selects a target to be subjected to computation processing by the processing unit on the basis of a traveling situation of the vehicle recognized by the another sensor.

(7-1) The information processing device according to (7) described above,
in which the control unit selects the target on the basis of priority for each traveling situation.

(8) The information processing device according to any one of (4) to (7) described above,
in which the control unit controls the order in which the processing unit carries out computation processing on each target when a plurality of targets is selected.

(9) The information processing device according to (8) described above,
in which the control unit controls the order on the basis of the required computation amount for each target.
(10) The information processing device according to (9) described above,
in which the control unit omits the computation processing of a target for which the processing unit does not have a sufficient surplus of computation capacity with respect to a required computation amount.
(11) The information processing device according to any one of (8) to (10) described above,
in which the information processing device is applied to a vehicle, and
the control unit controls the order on the basis of estimated collision time of the vehicle and each of the plurality of targets.
(12) The information processing device according to any one of (1) to (11) described above,
in which the control unit presents information regarding a target selected by the processing unit to carry out computation processing.
(12-1) The information processing device according to (12) described above,
in which the control unit presents information regarding priority of each target.
(13) The information processing device according to (10) described above,
in which the computing unit presents information regarding a target for which computation processing by the processing unit has been omitted.
(14) The information processing device according to any one of (1) to (13) described above,
in which the control unit changes the target to be subjected to computation processing by the processing unit on the basis of an instruction from the outside.
(15) The information processing device according to any one of (1) to (14) described above,
in which the information processing device is applied to a vehicle, and
the control unit instructs the vehicle to lower a vehicle speed in a case where the processing unit does not have a sufficient surplus of computation capacity.
(16) The information processing device according to any one of (1) to (14) described above,
in which the control unit instructs electric power securing in a case where the processing unit does not have a sufficient surplus of computation capacity.
(17) An information processing method including:
a process step of performing computation processing of a detection signal of a radar of FCM mode; and
a control step of controlling the computation processing mode in the process step on the basis of the detection result of another sensor.
(18) A computer program written in a computer-readable format to cause a computer to function as:
a processing unit that performs computation processing of a detection signal of a radar of FCM mode; and
a control unit that controls the computation processing mode in the processing unit on the basis of the detection result of another sensor.
(19) An Information processing system including:
a radar and another vehicle-mounted sensor mounted on a vehicle;
a recognition unit that performs recognition processing on the basis of a detection signal of the vehicle-mounted sensor;
a processing unit that performs computation processing of a detection signal of the radar using the FCM mode; and
a control unit that controls the computation processing mode in the processing unit on the basis of the result of recognition by the recognition unit.
(20) A mobile device including:
a mobile body;
a radar and another sensor mounted on the mobile body;
a recognition unit that performs recognition processing on the basis of a detection signal of the another sensor;
a processing unit that performs computation processing of a detection signal of the radar using the FCM mode,
a control unit that controls the computation processing mode in the processing unit on the basis of the result of recognition by the recognition unit; and
a mobile body control unit that controls the mobile body on the basis of the result of processing by the processing unit.

REFERENCE SIGNS LIST

100 Vehicle control system
101 Input unit
102 Data acquisition unit
103 Communication unit
104 In-vehicle apparatus
105 Output control unit
106 Output unit
107 Drive system control unit
108 Drive system
109 Body system control unit
110 Body system
111 Storage unit
112 Automatic driving control unit
121 Communication network
131 Detection unit
132 Self-position estimation unit
133 Situation examination unit
134 Planning unit
135 Operation control unit
141 Vehicle exterior information detection unit
142 Vehicle interior information detection unit
143 Vehicle state detection unit
151 Map analysis unit
152 Traffic rule recognition unit
153 Situation recognition unit
154 Situation prediction unit
161 Route planning unit
162 Action planning unit
163 Operation planning unit
171 Emergency avoidance unit
172 Acceleration/deceleration control unit
173 Direction control unit
200 Information processing system
201 Object recognition unit
202 Scene recognition unit
203 Traveling situation recognition unit
204 Selection unit
205 Planning unit
206 Computing unit
207 Presentation unit
208 Input unit
209 Main control unit
211 Urgency database for each subject
212 Priority subject database for each scene
213 Priority subject database for each traveling situation 214 Required computation amount database for each measurement target
221 Camera
222 LiDAR
223 Vehicle body sensor
224 Radar (millimeter-wave radar)

The invention claimed is:

1. An information processing device comprising:
a processor that performs computation processing of a detection signal of a radar of fast chirp modulation (FCM) mode;
another sensor detecting one or more targets in a scene; and
a controller coupled to the processor and the another sensor that controls a computation processing mode in the processor and selects at least one of the one or more targets detected by the another sensor to be subjected to a distance computation on a basis of detection result of the another sensor wherein a computational accuracy for the distance computation is selected based on the scene.

2. The information processing device according to claim 1,
wherein the radar is mounted on a vehicle and used, and the another sensor is a vehicle-mounted sensor of the same vehicle.

3. The information processing device according to claim 1,
wherein the controller controls at least one of a computation area or computation accuracy of computation processing in the processor on a basis of detection result of the another sensor.

4. The information processing device according to claim 1,
wherein the controller selects a target to be subjected to computation processing by the processor on a basis of a detection result of the another sensor.

5. The information processing device according to claim 4,
wherein the controller selects a target to be subjected to computation processing by the processor on a basis of result of object recognition by the another sensor.

6. The information processing device according to claim 4,
wherein the information processing device is applied to a vehicle, and
the controller selects a target to be subjected to computation processing by the processor on a basis of a scene encountered by the vehicle recognized by the another sensor.

7. The information processing device according to claim 4,
wherein the information processing device is applied to a vehicle, and
the controller selects a target to be subjected to computation processing by the processor on a basis of a traveling situation of the vehicle recognized by the another sensor.

8. The information processing device according to claim 4,
wherein the controller controls an order in which the processor carries out computation processing on each target when a plurality of targets is selected.

9. The information processing device according to claim 8,
wherein the controller controls the order on a basis of a required computation amount for each target.

10. The information processing device according to claim 9,
wherein the controller omits the computation processing of a target for which the processor does not have a surplus of computation capacity beyond a required computation amount.

11. The information processing device according to claim 8,
wherein the information processing device is applied to a vehicle, and
the controller controls the order on a basis of estimated collision time of the vehicle and each of the plurality of targets.

12. The information processing device according to claim 1,
wherein the controller presents information regarding an object selected by the processor to carry out computation processing.

13. The information processing device according to claim 10,
wherein the computing unit presents information regarding a target for which computation processing by the processor has been omitted.

14. The information processing device according to claim 1,
wherein the controller changes a target to be subjected to computation processing by the processor on a basis of an instruction from outside the controller.

15. The information processing device according to claim 1,
wherein the information processing device is applied to a vehicle, and
the controller instructs the vehicle to lower a vehicle speed in a case where the processor does not have a surplus of computation capacity beyond a required computation amount.

16. The information processing device according to claim 1,
wherein the controller instructs electric power securing in a case where the processor does not have a surplus of computation capacity beyond a required computation amount.

17. An information processing method comprising:
a process step of performing computation processing of a detection signal of a radar of fast chirp modulation (FCM) mode;
a sensor step of detecting one or more targets in a scene; and
a control step of controlling a computation processing mode in the process step and selecting at least one of the one or more targets detected in the sensor step to be subjected to a distance computation wherein a computational accuracy for the distance computation is selected based on the scene.

18. A computer program written on a non-transitory computer readable medium to cause a computer to function as:
a processor that performs computation processing of a detection signal of a radar of fast chirp modulation (FCM) mode;
another sensor detecting one or more targets in a scene; and
a controller coupled to the processor that controls a computation processing mode in the processor and selects at least one of the one or more targets detected by the another sensor to be subjected to a distance computation on a basis of detection result of the another sensor wherein a computational accuracy for the distance computation is selected based on the scene.

19. An information processing system comprising:
a radar and another vehicle-mounted sensor mounted on a vehicle;
a recognition unit coupled to the another vehicle-mounted sensor comprising circuitry that performs recognition processing on a basis of a detection signal of the vehicle-mounted sensor and detects one or more targets in a scene;
a processor coupled to the recognition unit that performs computation processing of a detection signal of the radar using a fast chirp modulation (FCM) mode; and
a controller coupled to the recognition unit and the processor that controls a computation processing mode in the processor and selects at least one of the one or more targets detected by the recognition unit to be subjected to a distance computation on a basis of result of recognition by the recognition unit wherein a computational accuracy for the distance computation is selected based on the scene.

20. A mobile device comprising:
a mobile body;
a radar and another sensor mounted on the mobile body;
a recognition unit coupled to the another sensor that performs recognition processing on a basis of a detection signal of the another sensor and detects one or more targets in a scene;
a processor coupled to the recognition unit that performs computation processing of a detection signal of the radar using an fast chirp modulation (FCM) mode;
a first controller coupled to the recognition unit and the processor that controls a computation processing mode in the processor and selects at least one of the one or more targets detected by the recognition unit to be subjected to a distance computation on a basis of result of recognition by the recognition unit wherein a computational accuracy for the distance computation is selected based on the scene; and
a second controller coupled to the mobile body that controls the mobile body on a basis of result of processing by the processor.

* * * * *